United States Patent
McIntosh et al.

(10) Patent No.: US 12,046,017 B2
(45) Date of Patent: Jul. 23, 2024

(54) SYSTEMS AND METHODS FOR EXTRACTING TEMPORAL INFORMATION FROM ANIMATED MEDIA CONTENT ITEMS USING MACHINE LEARNING

(71) Applicant: Google LLC, Mountain View, CA (US)

(72) Inventors: David McIntosh, San Francisco, CA (US); Erick Hachenburg, San Francisco, CA (US); Peter Chi Hao Huang, Pacifica, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 17/295,576

(22) PCT Filed: Apr. 30, 2020

(86) PCT No.: PCT/US2020/030727
§ 371 (c)(1),
(2) Date: May 20, 2021

(87) PCT Pub. No.: WO2021/167632
PCT Pub. Date: Aug. 26, 2021

(65) Prior Publication Data
US 2022/0406033 A1    Dec. 22, 2022

Related U.S. Application Data

(60) Provisional application No. 62/979,624, filed on Feb. 21, 2020.

(51) Int. Cl.
*G06F 40/30* (2020.01)
*G06F 16/435* (2019.01)
(Continued)

(52) U.S. Cl.
CPC ............ *G06V 10/62* (2022.01); *G06F 16/435* (2019.01); *G06F 16/489* (2019.01); *G06F 40/30* (2020.01);
(Continued)

(58) Field of Classification Search
CPC ...... G06V 10/62; G06V 10/776; G06V 20/41; G06V 20/635; G06V 20/70; G06F 16/435;
(Continued)

(56) References Cited

U.S. PATENT DOCUMENTS 10,897,649 B1    1/2021    Germano
2018/0025221 A1    10/2018    Welkie et al.
(Continued)

FOREIGN PATENT DOCUMENTS

CN    109145712    1/2019
CN    110427454    11/2019
(Continued)

OTHER PUBLICATIONS

Cai et al., A Spatial-Temporal Visual Mid-Level Ontology for GIF Sentiment Analysis, 2016 IEEE Congress on Evolutionary Computation (CEC)), pp. 4860-4865 (Year: 2016).*
(Continued)

*Primary Examiner* — Said M Elnoubi
(74) *Attorney, Agent, or Firm* — DORITY & MANNING P.A.

(57) ABSTRACT

A computer-implemented method can include receiving, by a computing system including one or more computing devices, data describing a media content item that includes a plurality of image frames for sequential display. The method can include inputting, by the computing system, the data describing the media content item into a machine-learned temporal analysis model that is configured to receive
(Continued)

the data describing the media content item, and in response to receiving the data describing the media content item, output temporal analysis data that describes temporal information associated with sequentially viewing the plurality of image frames of the media content item. The method can include receiving, by the computing system and as an output of the machine-learned temporal analysis model, the temporal analysis data.

18 Claims, 16 Drawing Sheets

(51) Int. Cl.
*G06F 16/48* (2019.01)
*G06V 10/62* (2022.01)
*G06V 10/776* (2022.01)
*G06V 20/40* (2022.01)
*G06V 20/62* (2022.01)
*G06V 20/70* (2022.01)

(52) U.S. Cl.
CPC ............ *G06V 10/776* (2022.01); *G06V 20/41* (2022.01); *G06V 20/635* (2022.01); *G06V 20/70* (2022.01)

(58) Field of Classification Search
CPC ........ G06F 16/489; G06F 40/30; G06F 16/78; G06F 16/43; G06N 3/044; G06N 3/082; G06N 5/022; G06N 3/084; G06N 7/01; G06N 20/00; G06N 3/04; G06N 3/08; H04N 21/8456; H04N 21/4662; H04N 21/812; H04N 21/8146
See application file for complete search history.

(56) References Cited

U.S. PATENT DOCUMENTS

| | | | |
|---|---|---|---|
| 2019/0266406 A1* | 8/2019 | Tang | G06F 16/51 |
| 2019/0373322 A1* | 12/2019 | Rojas-Echenique | G06N 3/045 |
| 2021/0034921 A1* | 2/2021 | Pinkovich | G06N 3/082 |

FOREIGN PATENT DOCUMENTS

| | | | |
|---|---|---|---|
| CN | 110020437 | | 4/2023 |
| EP | 2605152 | | 6/2013 |
| JP | 2009/111938 | | 5/2009 |
| KR | 20190091420 A | * | 8/2019 |
| WO | WO 2007/043679 | | 4/2007 |

OTHER PUBLICATIONS

International Preliminary Report on Patentability for Application No. PCT/US2020/030727, mailed Sep. 1, 2022, 6 pages.
Lin et al., "GIF Video Sentiment Detection Using Semantic Sequence", Mathematical Problems in Engineering, vol. 2017, Article ID 6863174, 2017, 11 pages.
Banerjee, "Machine Learning Models for Political Video Advertisement Classification", Iowa State University, 2017, 22 pages.
International Search Report and Written Opinion for PCT/US2020/030727, mailed on Sep. 10, 2020, 10 pages.
Lienhart, "Automatic Text Recognition for Video Indexing", 10 pages.
Liu et al., "Sentiment Recognition for Short Annotated GIFs Using Visual-Textual Fusion", Multimedia, 13 pages.
Cai et al., "A Spatial-Temporal Visual Mid-Level Ontology for GIF Sentiment Analysis", 2016 IEEE Congress on Evolutionary Computation (CEC), 6 pages.
Chinese Search Report Corresponding to Application No. 2020800051488 on Mar. 6, 2024.
Hong et al., "Classification of Video User Groups Based On Pop-Up Sentiment Analysis and Clustering Algorithm", Computer Engineering and Science, vol. 40, No. 6, Jun. 2018, 39 pages.

* cited by examiner

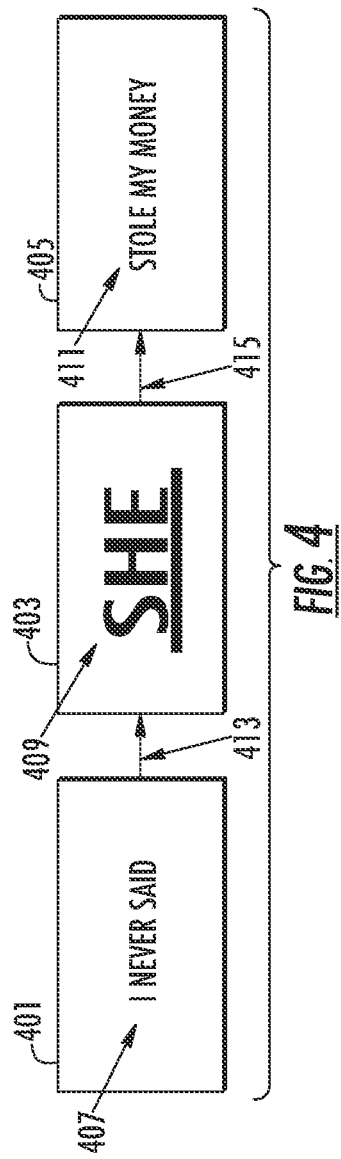

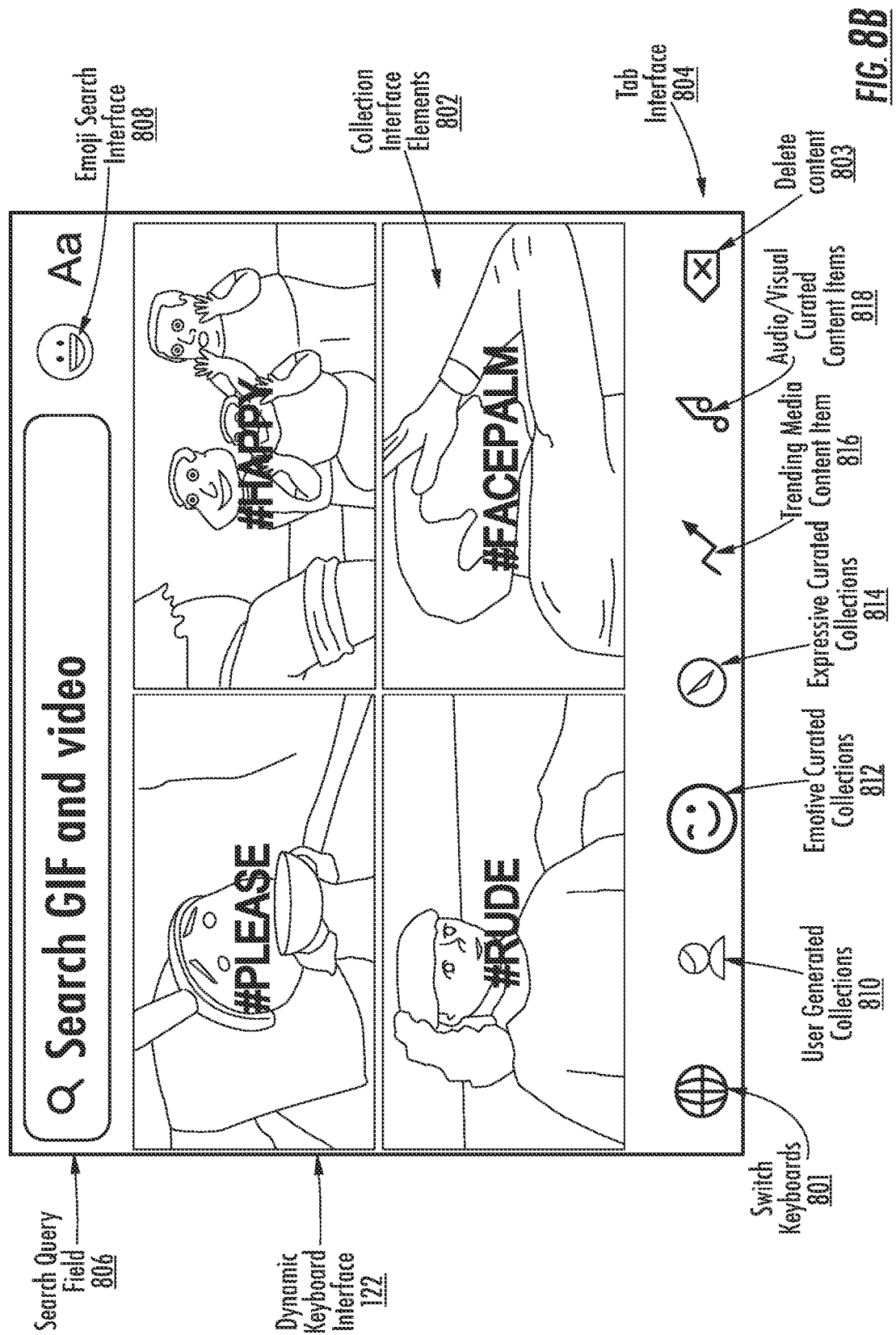

SYSTEMS AND METHODS FOR EXTRACTING TEMPORAL INFORMATION FROM ANIMATED MEDIA CONTENT ITEMS USING MACHINE LEARNING

CROSS-REFERENCE TO RELATED APPLICATIONS

The present application is a continuation of U.S. Provisional Patent Application Ser. No. 62/979,624, filed Feb. 21, 2020, the disclosure of which is hereby incorporated herein by reference in its entirety for all purposes.

FIELD

The present disclosure relates generally to computer vision. More particularly, the present disclosure relates to systems and methods for extracting temporal information from animated media content items using machine learning.

BACKGROUND

Conventional approaches for communicating between users of mobile devices may simply rely on SMS, messaging through a social networking application, or "texting." Internet or mobile device users may exchange messages through these various mediums. However, occasionally, users may wish to communicate via media content, such as GIFs (Graphics Interchange Format), or image files that include a static or animated set of images. Users may search the Internet for GIFs, copy them through an operating system's native web browser, and paste the GIFs in various messaging applications. These conventional systems are not well-suited to providing categorized content within a dynamic interface without expending resources or requiring manual intervention. Further such conventional systems fail to extract useful temporal information about animated media content items that is conveyed to viewers of the media content items.

SUMMARY

Aspects and advantages of embodiments of the present disclosure will be set forth in part in the following description, or can be learned from the description, or can be learned through practice of the embodiments.

According to one aspect of the present disclosure, a computer-implemented method can include receiving, by a computing system including gone or more computing devices, data describing a media content item comprising a plurality of image frames for sequential display; inputting, by the computing system, the data describing the media content item into a machine-learned temporal analysis model that is configured to receive the data describing the media content item, and in response to receiving the data describing the media content item, output temporal analysis data that describes temporal information associated with sequentially viewing the plurality of image frames of the media content item; and receiving, by the computing system and as an output of the machine-learned temporal analysis model, the temporal analysis data.

According to another aspect of the present disclosure, a computing system can include one or more processors and a machine-learned temporal analysis model that is configured to receive data describing the media content item, and in response to receiving the data describing the media content item, output temporal analysis data that describes temporal information associated with sequentially viewing the plurality of image frames of the media content item. The temporal information can be not described by individual image frames of the plurality of image frames. The computing system can include one or more non-transitory computer-readable media that collectively store instructions that, when executed by the one or more processors, cause the computing system to perform operations. The operations can include receiving data describing a media content item comprising a plurality of image frames for sequential display; inputting the data describing the media content item into the machine-learned temporal analysis model; and receiving, as an output of the machine-learned temporal analysis model, the temporal analysis data.

According to another aspect of the present disclosure, a computer-implemented method for training a machine-learned temporal analysis model can include receiving, by a computing system including one or more computing devices, data describing a media content item comprising a plurality of image frames for sequential display; inputting, by the computing system, the data describing the media content item into the machine-learned temporal analysis model that is configured to receive the data describing the media content item, and in response to receiving the data describing the media content item, output temporal analysis data that describes temporal information associated with sequentially viewing the plurality of image frames of the media content item. The temporal information can be not described by individual image frames of the plurality of image frames; The method can include receiving, by the computing system and as an output of the machine-learned temporal analysis model, the temporal analysis data and adjusting, by the computing system, one or more parameters of the machine-learned temporal analysis model based on a comparison of the temporal analysis data with ground truth temporal analysis data.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 4 is a schematic diagram of an example animated media content item that displays a series of text strings according to an example embodiment of the present disclosure.

FIGS. 8A-C are example screenshots of a dynamic keyboard interface provided to interact with content in a media content management system according to aspects of the present disclosure.

Figure 1A:
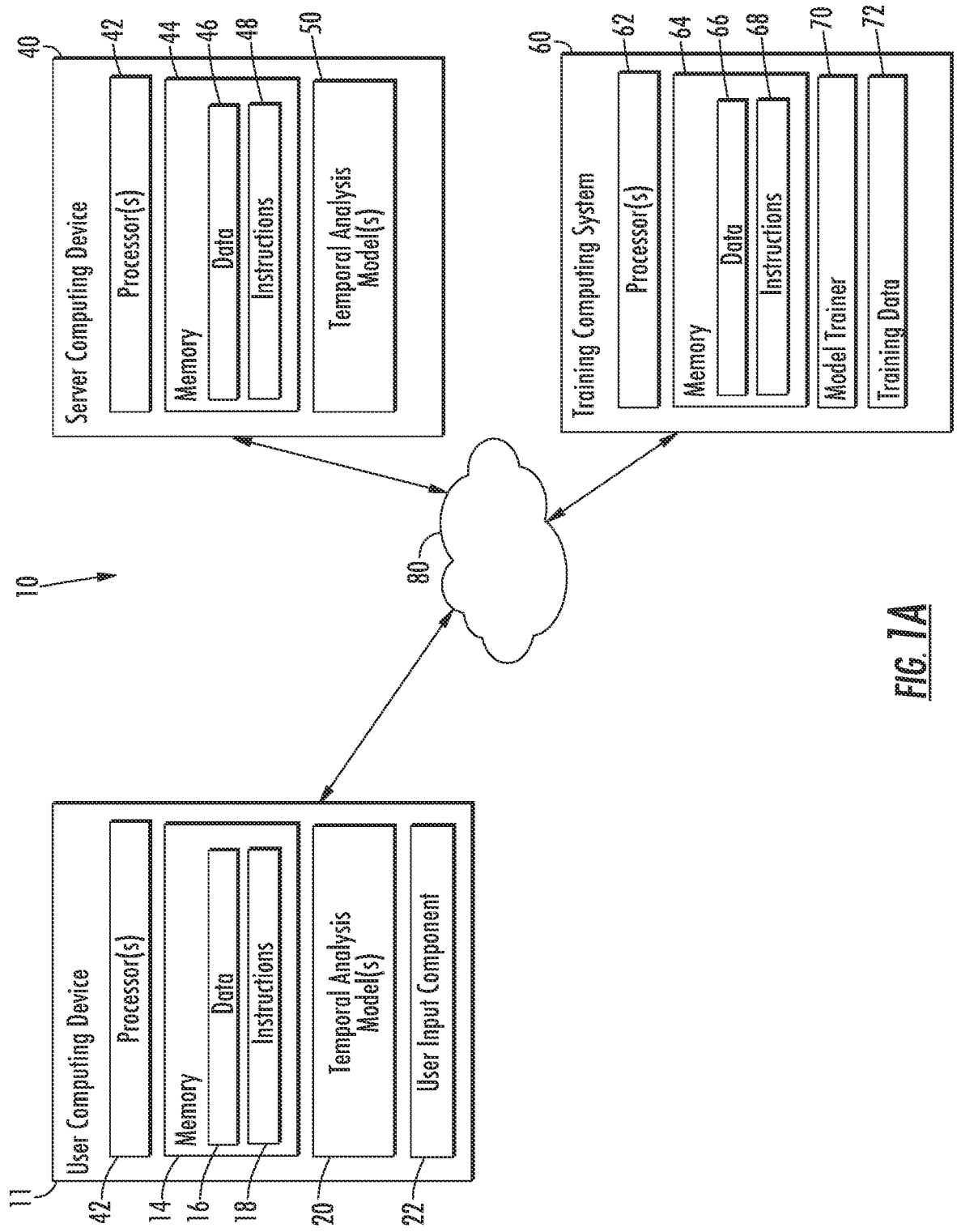
FIG. 1A depicts a block diagram of an example computing system for extracting temporal information from animated media content items using one or more machine-learned models according to example embodiments of the present disclosure.

Reference numerals that are repeated across plural figures are intended to identify the same features in various implementations.

DETAILED DESCRIPTION

Overview

Generally, the present disclosure is directed to systems and methods for extracting temporal information from animated media content items using machine learning. When certain animated media content items are viewed in animation, they can convey information to the viewer that may not be conveyed when any single frame of the animated media content item is analyzed. A temporal analysis machine-learned model can be trained to extract such temporal information. This information has a variety of useful applications. For example, this temporal information can be used to identify "unsafe" (e.g., vulgar, offensive, etc.) media content items that may not appear to be unsafe when viewed or analyzed frame-by-frame. Extracting temporal information as described herein can facilitate flagging of such items and/or removal of such items from search results. Further, extracting this temporal information can facilitate improved categorization of the items because media content items to be better "understood" as a user perceives them. As a result, better search results and suggestions can be provided to the user.

More particularly, according to aspects of the present disclosure, a computer implemented method for extracting temporal information can include receiving data describing a media content item that includes a plurality of image frames for sequential display, such as a Graphics Interchange Format (GIF) file. For example, the data describing the media content item may define image components of each image frame (such as edge or pixel attributes) and may, for example, be a GIF file itself. The method can include inputting the data describing the media content item into a machine-learned temporal analysis model. The machine-learned temporal analysis model can be configured to receive the data describing the media content item, and, in response, output temporal analysis data that describes temporal information associated with sequentially viewing the plurality of image frames of the media content item. As noted above, individual image frames of the plurality of image frames can fail to convey or describe this temporal information. Thus, analysis or classification on the set of image frames in combination may provide an improvement over techniques applied to each frame in isolation.

For example, some media content items can include dynamic captions, in which words or letters of the dynamic caption are sequentially displayed when the media content item is rendered in animation. The animated media content item can include a first image frame that includes a first text string (e.g., a first phrase, word, letter, etc.) and a second image frame including a second text string. (e.g., first phrase, word, letter, etc.) for display sequentially after the first image frame. Each word of a sentence or phrase can be sequentially displayed (e.g., flashed) as the media content item is rendered in animation. The machine-learned temporal analysis model can output temporal analysis data that describes a semantic meaning of the complete dynamic caption as perceived by a viewer of the animated media content item. In this example, the temporal analysis data can describe a semantic meaning of the first text string being sequentially read before the second text string. This semantic meaning can be lacking if the first text string and/or second text string is read individually without assessing the meaning of the text strings when combined. Thus, the temporal information output by the temporal analysis model can describe the semantic meaning of the entire dynamic caption when read by a viewer or the media content item.

As one example of such a dynamic caption, the first text string can include, "Good" and the second text string can include "Grief" When read or analyzed individually "Good" can convey happiness or joy, and "Grief" can convey sadness. A simple combination of an analysis of each text string fails to capture the meaning of the dynamic caption as read by a viewer. However, when analyzed using the machine-learned temporal analysis model, temporal information describing the phrase "Good Grief," can be extracted describing the meaning of the phrase, which can convey an entirely different emotion, such as lighthearted frustration. Thus, the machine-learned temporal analysis model can better extract meaning from dynamic captions than an individual analysis of text strings as they appear in the animated media content item.

Further, portions of dynamic captions can sometimes change appearance, which contribute to the meaning of the dynamic caption. For example, the appearance (e.g., location, color, size, font, etc.) of the words and/or letters of the dynamic caption can differ as the dynamic caption is rendered in animation. These changes in appearance can relay meaning, such as emphasis and de-emphasis. For instance, a particular word of the dynamic caption can be emphasized by making that word larger, bolder, in a more vibrant color, or the like, as compared with other words of the dynamic caption. As is commonly understood, one sentence can have a variety of different meanings depending on where the emphasis is placed in the sentence. The sentence "I never said she stole my money," has been used as an example of how changing emphasis can change the meaning of a sentence. This sentence has seven different meanings depending on which word is emphasized. "I never said she stole my money," implies that someone else did steal the money. "I never said she stole my money," implies that someone has accused the speaker of stating "she stole my money"; and so forth. The temporal analysis model can be trained to extract temporal information that describes the semantic meaning the dynamic caption based on differing appearances of the various text strings of the dynamic caption.

Similarly, the temporal analysis model(s) can extract temporal information included in changing scenes (e.g., with or without text) of objects, people, and the like. The plurality of image frames can include a first image frame describing or depicting a first scene and a second image frame describing a second scene for display sequentially after the first image frame. The temporal information can describe a semantic meaning of the first scene being sequentially viewed before the second scene that is not described or conveyed by individually viewing or analyzing the first scene or the second scene. Further, it should be understood that the extracted temporal information can describe a combination of a particular caption being displayed after a particular scene or vice versa.

In some embodiments, the temporal analysis data can describe an emotional content of the media content item. Examples of different emotional content can include anxiety, fear, anger, happiness, sadness, envy, desire, interest, shock, boredom, surprise, relief, disgust, shame, pity, and any other human emotion. A particular sequence of scenes can convey a particular emotion even though each individual scene may not convey that particular emotion when viewed or analyzed frame-by-frame or scene-by-scene. The extracted temporal analysis data can describe that particular emotion.

In some embodiments, the temporal analysis model (e.g., a segmentation model thereof) can be configured to generate one or more media content item segments from the media content item (e.g., corresponding to portions thereof). Temporal analysis data can be configured to generate intermediate temporal analysis data that describes temporal information respectively associated with the segments of the media content item. The temporal analysis model can be configured to process the intermediate temporal analysis data to generate the temporal analysis data.

In some embodiments, the segmentation model can be configured to automatically segment the media content item based on captions appearing, changing, moving, etc. and/or based on scenes changing in the media content item.

Further, in some embodiments, the system (e.g., temporal analysis model) can be configured to identify one or more segments of the media content item as corresponding to some or all of another media content item. The system can retrieve metadata and/or temporal analysis data for the segment(s) from the other media content item (e.g., temporal analysis data and/or metadata thereof). The retrieved data (e.g., temporal analysis data and/or metadata) can be used to generate the temporal analysis data for the media content item. For example, the retrieved data can be analyzed, weighted, combined, interpolated, or the like to generate composite data that describes the temporal content of the media content item itself. For example, first metadata can be retrieved that describes content of a first segment of the media content item, and second metadata can be retrieved that described content of a second segment of the media content item that is displayed after the first segment of the media content item 88. The temporal analysis data for the media content item can be generated based on an analysis of the effect of the content described by first metadata being viewed before the content described by the second metadata. Thus, segment temporal analysis data and/or segment metadata for segments of the media content item can be used to generate the temporal analysis data for the media content item.

In some embodiments, the media content item can include an advertisement and/or sponsored content. Such media content items can be provided in response to a search query (e.g., within a dynamic keyboard interface) and/or provided as a suggestion to user (e.g., as part of an auto-complete function for composing a message using a messaging application). Extracting temporal information as described herein can be particularly useful for sponsored media content. Improved categorization and/or providing improved search results to search queries can encourage user engagement, thus increasing the effectiveness of the advertisement. For example, advertisements can be better categorized by a semantic meaning of a dynamic caption and/or by emotional content. For instance, an advertisement depicting surprise (in a manner that is not readily determined using frame-by-frame analysis) can be provided in response to a search query associated with the same. As a result, more relevant sponsored media content items can be provided in response to the search query, thereby increasing user engagement with the sponsored media content items.

The systems and methods of the present disclosure can provide a number of technical effects and benefits. For example, fewer, more accurate search results can be transmitted to a user computing device in response to a given search query. As a result, fewer computing sources can be consumed or required to transmit and/or store the search results (e.g., storage size on the user computing device and/or server computing device, data transmission bandwidth, etc.). Additionally, the user can more easily locate an appropriate or a specific media content item, thereby reducing the number of searches the user needs to perform. Further, the analysis or classification of the media content items can provide a more accurate description of the content of the media content items. For example, the data describing the media content item that is input into the machine-learned temporal analysis model may describe or define image components of each image frame (such as edge or pixel attributes) of a set of image frames and may, for example, be a GIF file itself. The machine-learned temporal analysis model may be trained to analyze this underlying image frame data to produce the temporal analysis data output. The temporal analysis data output by the machine-learned temporal analysis model can describe the subject matter displayed in the set of image frames (when displayed in animation) in a manner that is more accurate than data produced by a frame-by-frame analysis of the set of image frames. Thus, the present application provides a technical solution (e.g., improved image and video processing and analysis) for a technical problem (e.g., understanding, classifying, and/or categorizing media, such as short videos of GIFs).

For example, the temporal information can describe, identify, and/or be used to identify and/or detect predetermined patterns in the media content items that may not appear when analyzed frame-by-frame. Extracting temporal information as described herein can facilitate identifying or detecting such pre-determined patterns not normally detectable when the media content is analyzed frame-by-frame and facilitate removing from search results media content items that are associated with and/or that include said predetermined patterns. As a result, search results can be provided more accurately and efficiently saving computational resources and transmission bandwidth.

More particularly, according to aspects of the present disclosure, a computer implement method for extracting temporal information can include receiving data describing a media content item that includes a plurality of image frames for sequential display, such as a Graphics Interchange Format (GIF) file. The method can include inputting the data describing the media content item into a machine-learned temporal analysis model. The machine-learned temporal analysis model can be configured to receive the data describing the media content item, and, in response, output temporal analysis data that describes temporal information associated with sequentially viewing the plurality of image frames of the media content item.

Further, the plurality of image frames may comprise a first image frame comprising a first digital image and a second digital image for display sequentially after the first image frame, the second image frame can include a second digital image. The temporal information described by the temporal analysis data may describe a pattern described by the first digital image being sequentially detected before the second digital image that is not described by individually detecting the first digital image or the second digital image.

Further, the first digital image of the first image frame may have an appearance that differs from an appearance of the second digital image of the second image frame by at least one of color, boldness, location, or shape. Further, the temporal analysis data may describe a pattern associated with the first digital image having the appearance that differs from the appearance of the second digital image. Said pattern, associated with the first digital image having the appearance that differs from the appearance of the second digital image, may be compared with a predetermined pattern and the media content items associated with or including said predetermined patterns may be removed from the search results if the pattern matches with the predetermined pattern.

As one example, the systems and methods of the present disclosure can be included or otherwise employed within the context of an application, a browser plug-in, or in other contexts. Thus, in some implementations, the models of the present disclosure can be included in or otherwise stored and implemented by a user computing device such as a laptop, tablet, or smartphone. As yet another example, the models can be included in or otherwise stored and implemented by a server computing device that communicates with the user computing device according to a client-server relationship. For example, the models can be implemented by the server computing device as a portion of a web service (e.g., a web email service).

With reference now to the Figures, example embodiments of the present disclosure will be discussed in further detail.

Example Devices and Systems

FIG. 1A depicts a block diagram of an example computing system 10 that for extracting temporal information from animated media content items using machine-learned models according to example embodiments of the present disclosure. The system 10 can include a user computing device 11, a server computing system 40, and a training computing system 60 that are communicatively coupled over a network 80.

The user computing device 11 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 11 includes one or more processors 12 and a memory 14. The one or more processors 12 can be any suitable processing device (e.g., a processor core, a microprocessor, an ASIC, a FPGA, a controller, a microcontroller, etc.) and can be one processor or a plurality of processors that are operatively connected. The memory 14 can include one or more non-transitory computer-readable storage mediums, such as RAM, ROM, EEPROM, EPROM, flash memory devices, magnetic disks, etc., and combinations thereof. The memory 14 can store data 16 and instructions 18 which are executed by the processor 12 to cause the user computing device 11 to perform operations.

The user computing device 11 can store or include one or more temporal analysis models 20. For example, the temporal analysis model(s) 20 can be or can otherwise include various machine-learned models such as neural networks (e.g., deep neural networks) or other multi-layer non-linear models. Neural networks can include recurrent neural networks (e.g., long short-term memory recurrent neural networks), feed-forward neural networks, or other forms of neural networks. Example temporal analysis model(s) 20 are discussed with reference to FIG. 2.

In some implementations, the one or more temporal analysis model(s) 20 can be received from the server computing system 40 over network 80, stored in the user computing device memory 14, and the used or otherwise implemented by the one or more processors 12. In some implementations, the user computing device 11 can implement multiple parallel instances of a single temporal analysis model(s) 20 (e.g., to perform parallel analyses across multiple instances of the model 20).

Additionally or alternatively, one or more temporal analysis model(s) 50 can be included in or otherwise stored and implemented by the server computing system 40 that communicates with the user computing device 11 according to a client-server relationship. For example, the temporal analysis model(s) 50 can be implemented by the server computing system 40 as a portion of a web service. Thus, one or more models 20 can be stored and implemented at the user computing device 11 and/or one or more models 50 can be stored and implemented at the server computing system 40.

The user computing device 11 can also include one or more user input components 22 that receives user input. For example, the user input component 22 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication.

The server computing system 40 includes one or more processors 42 and a memory 44. The one or more processors 42 can be any suitable processing device (e.g., a processor core, a microprocessor, an ASIC, a FPGA, a controller, a microcontroller, etc.) and can be one processor or a plurality of processors that are operatively connected. The memory 44 can include one or more non-transitory computer-readable storage mediums, such as RAM, ROM, EEPROM, EPROM, flash memory devices, magnetic disks, etc., and combinations thereof. The memory 44 can store data 46 and instructions 48 which are executed by the processor 42 to cause the server computing system 40 to perform operations.

In some implementations, the server computing system 40 includes or is otherwise implemented by one or more server computing devices. In instances in which the server computing system 40 includes plural server computing devices, such server computing devices can operate according to sequential computing architectures, parallel computing architectures, or some combination thereof.

As described above, the server computing system 40 can store or otherwise includes one or more machine-learned temporal analysis models 50. For example, the models 50 can be or can otherwise include various machine-learned models such as neural networks (e.g., deep recurrent neural networks) or other multi-layer non-linear models. Example models 50 are discussed with reference to FIG. 2.

The server computing system 40 can train the models 20, 50 via interaction with the training computing system 60 that is communicatively coupled over the network 80. The training computing system 60 can be separate from the server computing system 40 or can be a portion of the server computing system 40.

The training computing system 60 can include one or more processors 62 and a memory 64. The one or more processors 62 can be any suitable processing device (e.g., a processor core, a microprocessor, an ASIC, a FPGA, a controller, a microcontroller, etc.) and can be one processor or a plurality of processors that are operatively connected. The memory 64 can include one or more non-transitory computer-readable storage mediums, such as RAM, ROM, EEPROM, EPROM, flash memory devices, magnetic disks, etc., and combinations thereof. The memory 64 can store data 66 and instructions 68 which are executed by the processor 62 to cause the training computing system 160 to perform operations. In some implementations, the training computing system 60 includes or is otherwise implemented by one or more server computing devices.

The training computing system 60 can include a model trainer 70 that trains the machine-learned models 50 stored at the server computing system 40 and/or models 20 stored at the user computing device 11 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In some implementations, if the user has provided consent, the training examples can be provided by the user computing device 11 (e.g., based on communications previously provided by the user of the user computing device 11). Thus, in such implementations, the model 20 provided to the user computing device 11 can be trained by the training computing system 60 on user-specific communication data received from the user computing device 11. In some instances, this process can be referred to as personalizing the model.

The model trainer 70 includes computer logic utilized to provide desired functionality. The model trainer 70 can be implemented in hardware, firmware, and/or software controlling a general purpose processor. For example, in some implementations, the model trainer 70 includes program files stored on a storage device, loaded into a memory and executed by one or more processors. In other implementations, the model trainer 70 includes one or more sets of computer-executable instructions that are stored in a tangible computer-readable storage medium such as RAM hard disk or optical or magnetic media. The model trainer 70 can train the model(s) 20, 50 based on training data 72.

The network 80 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 11 can include the model trainer 70 and the training dataset 72. In such implementations, the models 120 can be both trained and used locally at the user computing device 102. In some of such implementations, the user computing device 102 can implement the model trainer 160 to personalize the models 120 based on user-specific data.

Figure 1B:
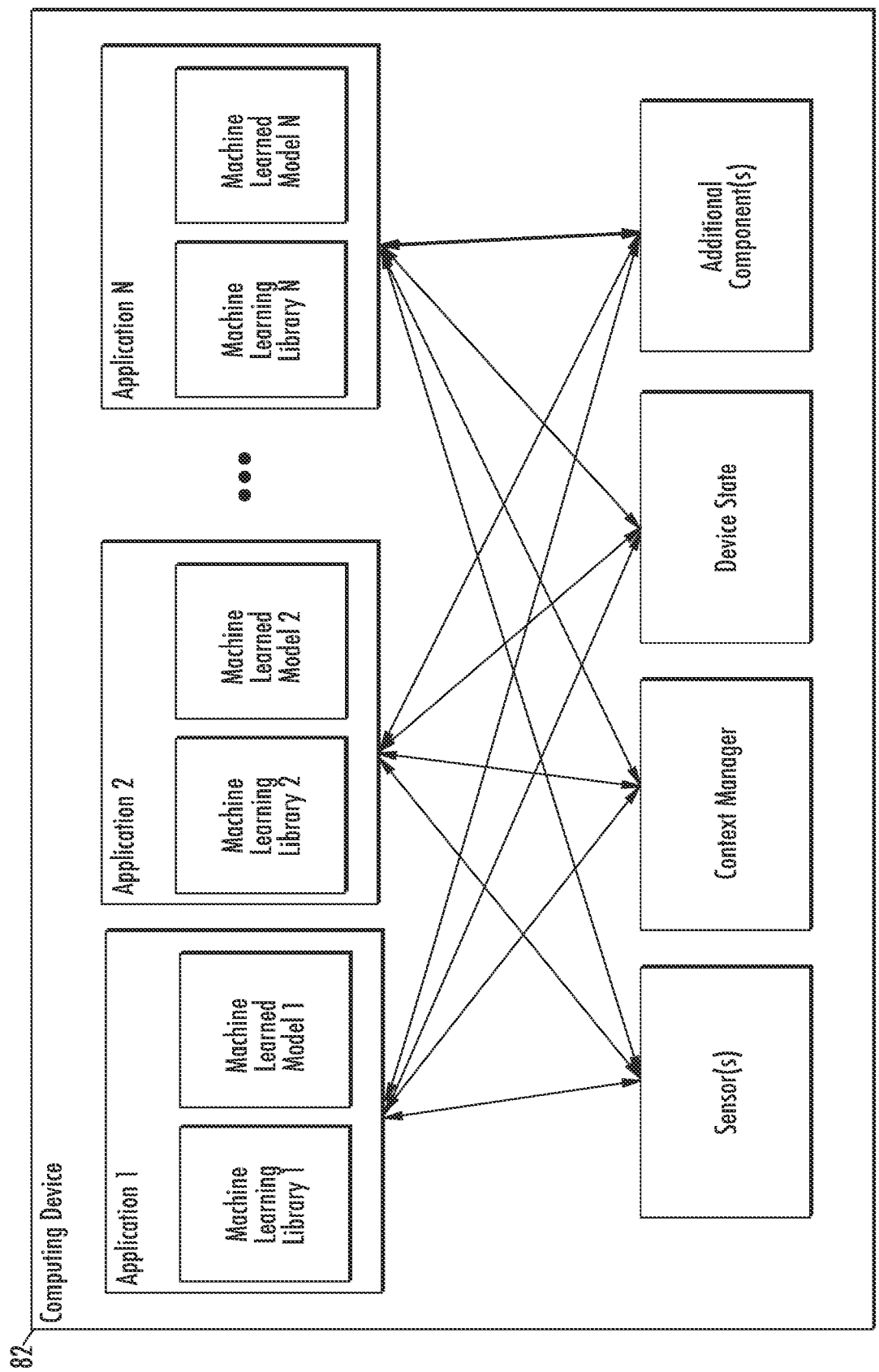
FIG. 1B depicts a block diagram of an example computing for extracting temporal information from animated media content items using one or more machine-learned models according to example embodiments of the present disclosure.

FIG. 1B depicts a block diagram of an example computing device 82 that performs according to example embodiments of the present disclosure. The computing device 82 can be a user computing device or a server computing device.

The computing device 82 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
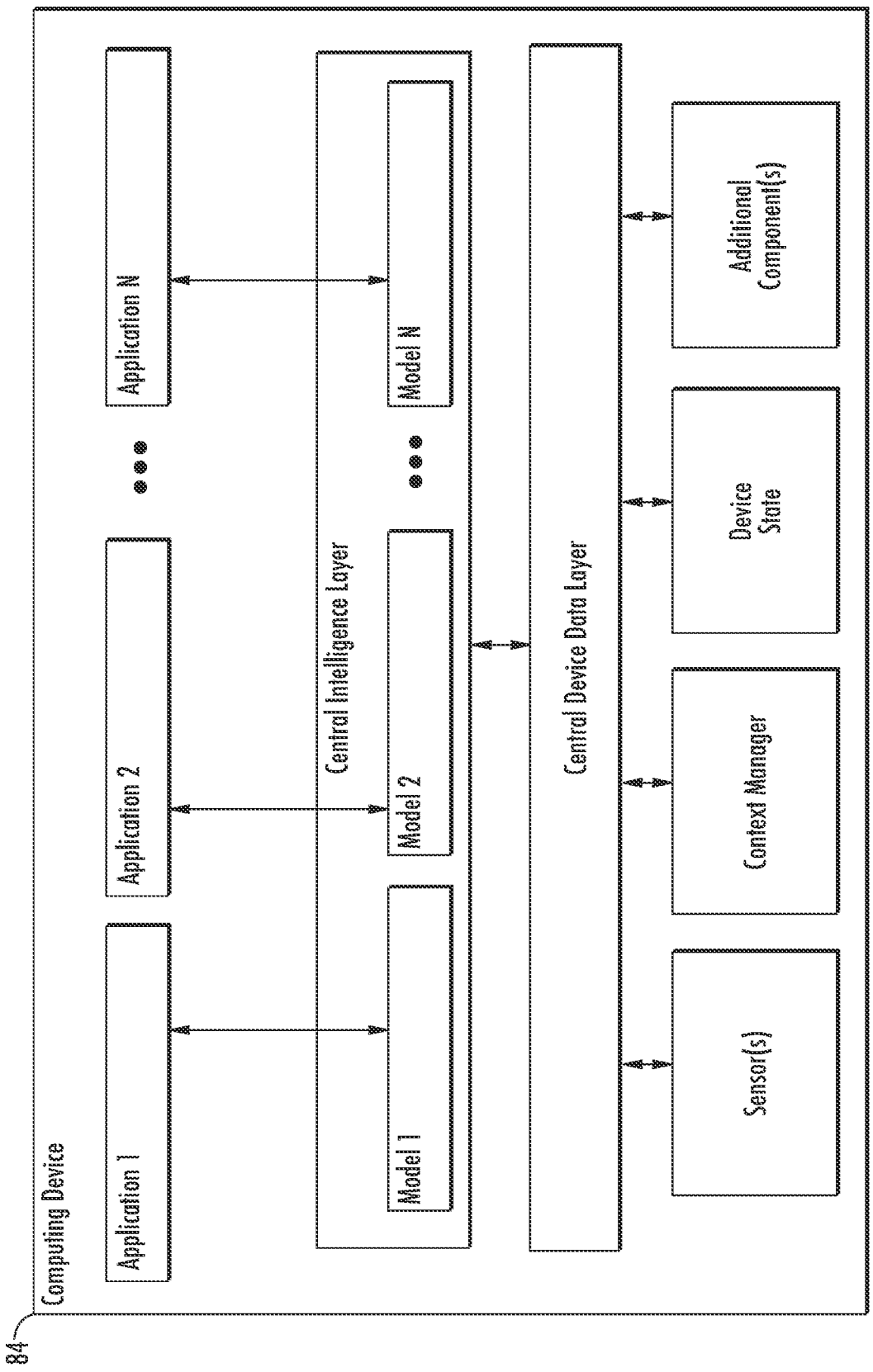
FIG. 1C depicts a block diagram of an example computing device for extracting temporal information from animated media content items using one or more machine-learned models according to example embodiments of the present disclosure.

FIG. 1C depicts a block diagram of an example computing device 84 that performs according to example embodiments of the present disclosure. The computing device 84 can be a user computing device or a server computing device.

The computing device 84 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 84.

The central intelligence layer can communicate with a central device data layer. The central device data layer can be a centralized repository of data for the computing device 84. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
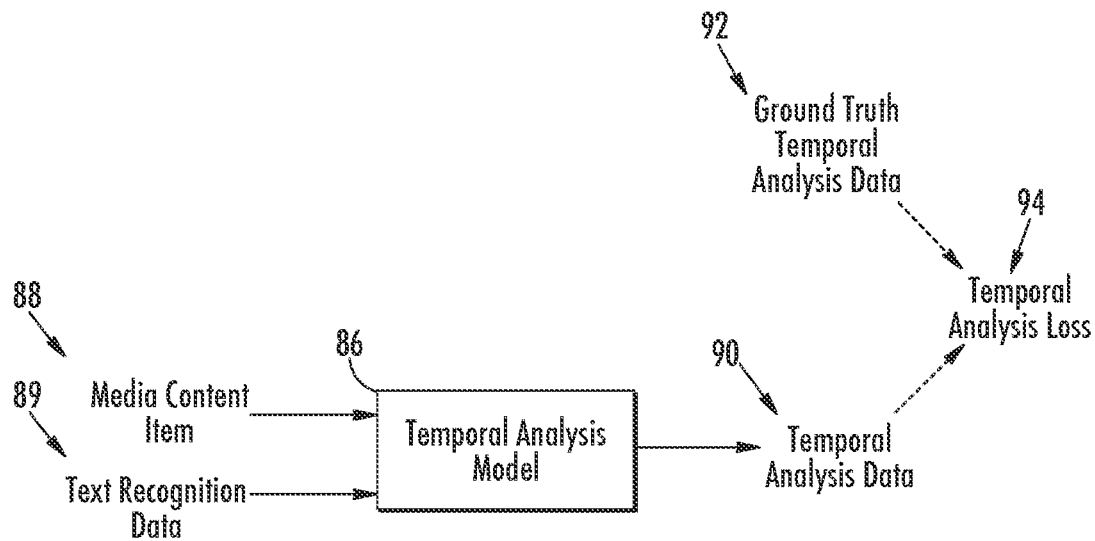
FIG. 2 depicts a block diagram of an example machine-learned temporal analysis model according to example embodiments of the present disclosure.

FIG. 2 depicts a block diagram of an example temporal analysis model 86 according to example embodiments of the present disclosure. In some implementations, the temporal analysis model 86 is trained to receive data that describes a media content item 88 that includes a plurality of image frames for sequential display (e.g., a Graphics Interchange Format (GIF) file). The machine-learned temporal analysis model 86 can be configured to receive the data describing the media content item 88, and, in response, output temporal analysis data 90 that describes temporal information associated with sequentially viewing the plurality of image frames of the media content item 88. Individual image frames of the media content item 88 can fail to convey or describe the temporal information described by the temporal analysis data 90. The temporal analysis model 86 may also be configured to receive text recognition data 89 that describes one or more text strings recognized in one more image frames of the media content item 88. The text recognition data 89 may be received from a natural language parser (NLP), for example as described below with reference to FIGS. 6A and 7B.

In some embodiments, the temporal analysis model 86 (e.g., a segmentation model thereof) can be configured to generate one or more media content item segments from the media content item 88. Temporal analysis data 90 can be configured to generate intermediate temporal analysis data that describes temporal information respectively associated with the segments of the media content item 88. The temporal analysis model 86 can be configured to process the intermediate temporal analysis data to generate the temporal analysis data 90.

In some embodiments, the segmentation model can be configured to automatically segment the media content item 88 based on captions appearing, changing, moving, etc. and/or based on scenes changing in the media content item 88.

Further, in some embodiments, the system (e.g., temporal analysis model 86) can be configured to identify one or more segments of the media content item 88 as corresponding to some or all of another media content item. The system can retrieve metadata and/or temporal analysis data for the segment(s) from the other media content item (e.g., temporal analysis data and/or metadata thereof). The retrieved data (e.g., temporal analysis data and/or metadata) can be used to generate the temporal analysis data for the media content item 88. For example, the retrieved data can be analyzed, weighted, combined, interpolated, or the like to generate composite data that describes the temporal content of the media content item 88 itself. For example, first metadata can be retrieved that describes content of a first segment of the media content item 88, and second metadata can be retrieved that described content of a second segment of the media content item 88 that is displayed after the first segment of the media content item 88. The temporal analysis data for the media content item 88 can be generated based on an analysis of the effect of the content described by first metadata being viewed before the content described by the second metadata. Thus, segment temporal analysis data and/or segment metadata for segments of the media content item 88 can be used to generate the temporal analysis data for the media content item 88.

Aspects of the present disclosure are directed to training the temporal analysis model 86. One or more parameter of the temporal analysis model 86 can be adjusted based on a comparison of the temporal analysis data 90 output by the temporal analysis model 86 with ground truth temporal analysis data 92. For example, a temporal analysis loss 94 can be calculated that describes a comparison between the temporal analysis data 90 and the ground truth temporal analysis data 92. The parameters of the temporal analysis model 86 can be iteratively adjusted, for example using back propagation of errors, based on the temporal analysis loss 94.

The temporal analysis data 90 and/or ground truth temporal analysis data 92 can include or describe a variety of information. For example, the temporal analysis data 90 and/or ground truth temporal analysis data 92 can include or describe one or more content associations (e.g., as described below with reference to FIGS. 5A through 5C), an emotional content of the animated media content item, a meaning of a dynamic caption (e.g., including any emphasis), and so forth.

Example Methods

Figure 3:
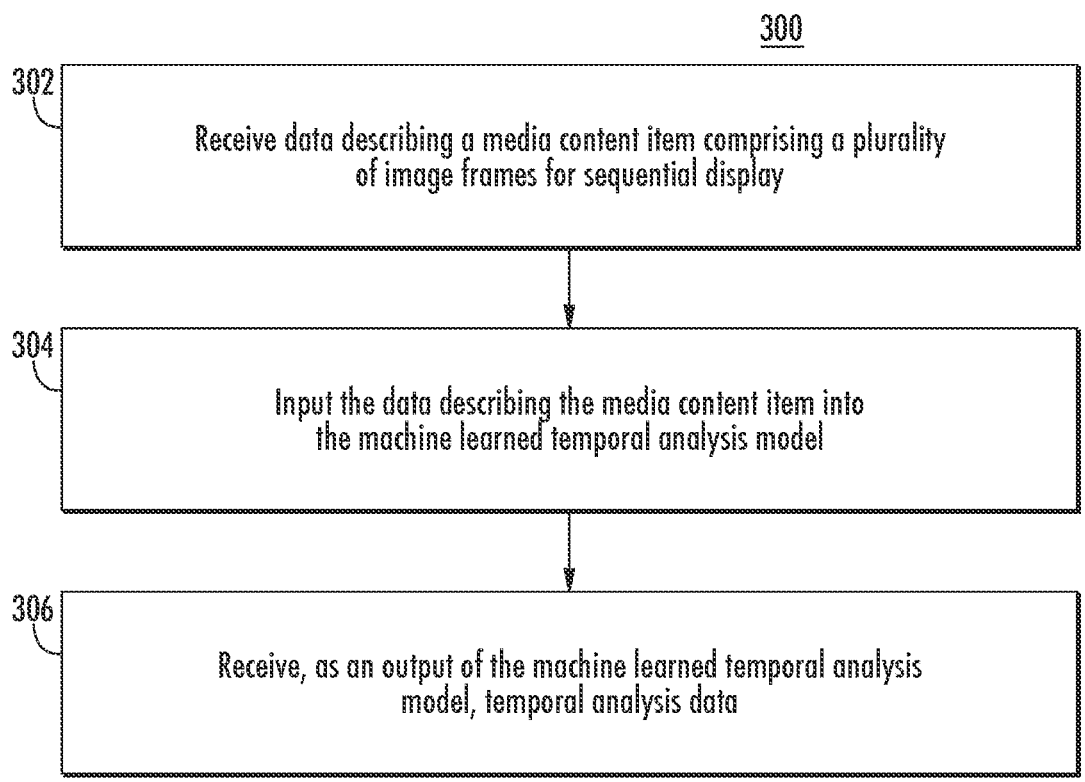
FIG. 3 depicts a flow chart diagram of an example method for extracting temporal information from animated media content items using one or more machine-learned models according to example embodiments of the present disclosure.

FIG. 3 depicts a flow chart diagram of an example method to perform according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can receive data describing a media content item including a plurality of image frames for sequential display, such as a Graphics Interchange Format (GIF) file. For example, the computing system can receive the media content item(s) from a media content store 106, media content sources 124, third party applications 202 and/or user devices 102 as described with reference to FIGS. 5A through 7B.

At 304, the computing system can input the data describing the media content item into the machine-learned temporal analysis model, for example as described above with reference to FIGS. 1A through 2. The machine-learned temporal analysis model can be configured to receive the data describing the media content item, and, in response, output temporal analysis data that describes temporal information associated with sequentially viewing the plurality of image frames of the media content item. Individual image frames of the plurality of image frames can fail to convey or describe the temporal information. The temporal analysis data can describe a semantic meaning, tone, and/or emotional content of the media content item and/or a dynamic caption included therein.

At 306, the computing system can receive, as an output of the machine-learned temporal analysis model, the temporal analysis data. The temporal analysis data can be used to identify "unsafe" (e.g., vulgar, offensive, etc.) media content items that may not appear to be unsafe when viewed or analyzed frame-by-frame and/or facilitate improved categorization of the media content items as they can be better "understood" as a user perceives them. Thus, the temporal analysis data can be employed to improve the relevance of search results and/or suggestion that include media content items for the user.

Referring to FIG. 4, in some implementations, the media content item can include a dynamic caption, in which words or letters of the dynamic caption are sequentially displayed when the media content item is rendered in animation. The animated media content item can include a first image frame 402 that includes a first text string 408 e.g., a first phrase, word, letter, etc.) and a second image frame 404 including a second text string 410. (e.g., first phrase, word, letter, etc.) for display sequentially after the first image frame 402. The animated media content item can also optionally include a third image frame 406 that includes a third text string 412.

The dynamic caption can be sequentially displayed (e.g., as illustrated by arrows 414, 416) connecting the image frames 402, 404, 406. sentence can be sequentially displayed (e.g., flashed) as the media content item is rendered in animation. The temporal analysis data can describe a semantic meaning of the complete dynamic caption as perceived by a viewer of the animated media content item. More specifically, the temporal analysis data can describe a semantic meaning of the first text string 408 being sequentially read before the second text string 410 (and third text string 412 and so forth, if present). This semantic meaning can be lacking in individual readings of the first text string 408 or the second text string 410. Thus, the temporal information output by the temporal analysis model can describe the semantic meaning of the entire dynamic caption when read by a viewer or the media content item.

As one example of such a dynamic caption, the first text string can include, "Good" and the second text string can include "Grief" When read or analyzed individually "Good" can convey happiness or joy, and "Grief" can convey sadness. However, when analyzed as a dynamic caption, the phrase "Good Grief," conveys an entirely different emotion, such as lighthearted frustration.

Referring again to FIG. 4, portions of dynamic captions can sometimes change appearance. For example, the appearance (e.g., location, color, size, font, etc.) of the words and/or letters of the dynamic caption can differ as the dynamic caption is rendered in animation. These changes in appearance can relay meaning, such as an emphasis. A particular word of the dynamic caption can be emphasized by making the word larger, bolder, in a more vibrant color, or the like, as compared with other words of the dynamic caption. Such emphasis can affect the meaning of the dynamic caption. As is commonly understood, the same sentence can have various different meanings depending on which word(s) are emphasized in the sentence. For instance, the sentence "I never said she stole my money," has been used as an example of how emphasis can change the meaning of a sentence. This sentence has seven different meanings depending on which word is emphasized. "I never said she stole my money," implies that someone else did. "I never said she stole my money," implies that someone has accused the speaker of saying that she stole his money; and so forth. The temporal analysis model can be trained to extract temporal information that describes the meaning of such differing meanings based on differing appearances of the text strings of the dynamic caption.

As one example, an animated media content item can sequentially display three image frames 402, 404, 406. The first image frame 402 can include the first text string 408 "I never said." The second image frame 404 can include the second text string 410 "She," and the third image frame 406 can include the third text string 412 "sole my money." One or more of the text strings (e.g., the second text string 410 in this example) can be emphasized by being displayed larger, bolder, in a more vibrant color, or the like, as compared with other words of the dynamic caption.

The temporal analysis data can describe a meaning of the dynamic caption when read sequentially. In the example described above with reference to FIG. 4, the temporal analysis data can include semantic meaning imparted by the emphasis from the the second text string 410 differing in appearance from the other text strings 408, 412. More specifically, in this example, the temporal analysis data can describe a semantic meaning that implies that the speaker said that someone else stole his money. Thus, the temporal analysis data can describe a semantic meaning of the dynamic caption when viewed sequentially by a reader, including emphasis from differing visual characteristics of the text strings 408, 410, 412 of the dynamic caption.

Similarly, the temporal analysis model(s) can extract temporal information included in changing scenes (e.g., with or without text) of objects, people, and the like. The plurality of image frames can include a first image frame describing or depicting a first scene and a second image frame describing a second scene for display sequentially after the first image frame. The temporal information can describe a semantic meaning of the first scene being sequentially viewed before the second scene that is not described or conveyed by individually viewing or analyzing the first scene or the second scene.

In some embodiments, the temporal analysis data can describe an emotional content of the media content item. Examples of different emotional content can include anxiety, fear, anger, happiness, sadness, envy, desire, interest, shock, boredom, surprise, relief, disgust, shame, pity, and any and all other human emotions. A particular sequence of scenes can convey a particular emotion even though the individual scenes may not convey that particular emotion when viewed or analyzed frame-by-frame or scene-by-scene.

In some embodiments, the media content item can include an advertisement and/or sponsored content. Such media content items can be provided in response to a search query (e.g., within a dynamic keyboard interface) and/or provided as a suggestion to user (e.g., as part of an auto-complete function for composing a message using a messaging application). Extracting temporal information as described herein can be particularly useful for sponsored media content.

Improved categorization and/or providing improved search results to search queries can encourage user engagement, thus increasing the effectiveness of the advertisement. For example, advertisements can be better categorized by a semantic meaning of a dynamic caption and/or by emotional content. For instance, an advertisement depicting surprise can be provided in response to a search query associated with the same. As a result, the user can be more likely to engage with the sponsored media content item.

Example Configurations

Figure 5A:
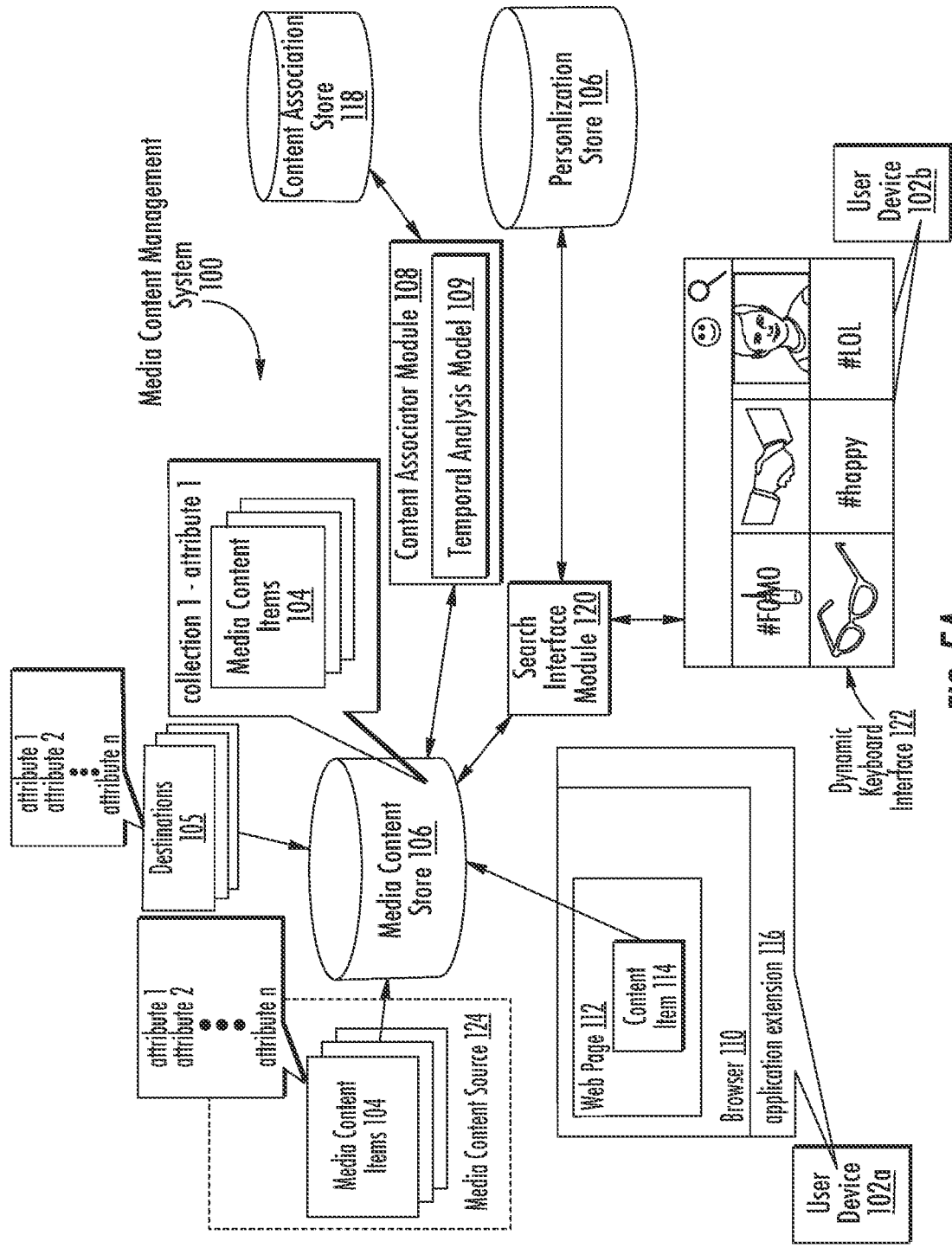
FIG. 5A is a high-level block diagram depicting a media content management system according to aspects of the present disclosure.

FIG. 5A is a high-level block diagram depicting a media content management system 100, according to some embodiments. The media content management system 100 may receive media content items 104 from media content sources 124 that are stored in a media content store 106. FIG. 5A and the other figures use like reference numerals to identify like elements. A letter after a reference numeral, such as "102 a," indicates that the text refers specifically to the element having that particular reference numeral. A reference numeral in the text without a following letter, such as "102," refers to any or all of the elements in the figures bearing that reference numeral (e.g., "102" in the text refers to reference numerals "102 a" and/or "102 b" in the figures). Only two user devices 102 are illustrated in FIG. 5A in order to simplify and clarify the description. Administrators may access the media content management system 100 through a user device 102 (e.g., user devices 102 a and 102 b) through a separate login process, in one embodiment.

As mentioned above, media content items 104 may include various types of content, such as animated GIFs (a series of images), a static image, an audio-visual content item/video, as well as composite content items, such as multiple animated GIFs and/or image content. Media content items 104 are received to the media content management system 100 and stored into the media content store 106. A media content item 104 may have one or more attributes, such as content source, dimensions, content branding (e.g., Paramount Pictures, NBC Universal, etc.), characters included in the content, text strings included in the content, and so forth. Attributes may include metadata attributes, in one embodiment.

In the media content store 106, a media content item 104 may be stored in associated with a collection, or a grouping of media content items 104. Collections may be generated by administrators of the media content management system 100, in one embodiment. A collection may be automatically generated, in one embodiment, based on one or more attributes shared by the media content items 104 in the collection. In an embodiment, a content association, or a unique identifier, may be used to denote a collection in the media content management system 100. For example, a media content item 104 may be "content associated" as part of the "#happy" collection in the media content management system 100. In one embodiment, a user or an administrator may content association the media content item 104 as part of the "#happy" collection. In another embodiment, the media content item 104 may be automatically associated with the media content item 104 by a content associator module 108 using content associations stored in a content association store 118. In this way, content may be procured and categorized using content associations, such as "#happy," in the media content management system 100. Individual collections, or set of files, may each be labeled with a content association in the media content management system 100. A particular file may be associated with one or more content associations, in one embodiment.

The content associator module 108 may include one or more temporal analysis models 109, for example as described above with reference to the temporal analysis model 86 of FIG. 2. The content associate module 108 may be configured to analyze the media content items 104 and generate content associations for the media content items 104 based on temporal analysis data extracted from the media content items.

In one embodiment, a user of the media content management system 100 may, through a user device 102 a, add content to a media content management system 100. For example, a user may have installed an application extension 116 onto the user device 102 a such that the user can "save" a content item 114 found through browsing a web page 112 using a browser 110 on the user device 102 a. By saving the content item 114 using the application extension 116, the URL (Uniform Resource Locator) may be stored in association with the content item 114 as an attribute of the content item, in one embodiment. The application extension 116 may, in one embodiment, include a downloadable application that enables a user to browse to a web page and collect media content items presented on the web page. As an example, a web page for a blog may post a particularly interesting content item that may or may not be available on the media content management system 100. Using the application extension 116, the user may browse to the web page 112, access a menu through the browser 110, and select an option to save one or more content items 114 that have been presented on the web page 112. In one embodiment, the application extension 116 is a mobile application that enables mobile browsers 110 to perform this functionality. In other embodiments, the application extension 116 may be a browser extension application or applet that may be downloaded through the browser 110 on a mobile device or desktop computer. In a further embodiment, the application extension 116 may enable users to directly upload content items 114 to the media content store 106 in the media content management system 100.

In another embodiment, a copy of the content item 114 is stored in the media content store 106 as part of a user operating the application extension 116 described above. In a further embodiment, a link or a URL of the content item 114 is stored in the media content store 106. In yet another embodiment, a copy of the content item 114 is stored onto the user device 102 a as part of a "saved" collection, or a user-generated collection on the user device 102 a. A user may sign into his or her account on various user devices 102 such that the collections may be synchronized between the user devices 102, including user-generated collections such as the "saved" collection.

Content items 114, presented on web pages 112 or otherwise accessible through web servers, may be procured by administrators of the media content management system 100 in other ways, in an embodiment. For example, content owners, such as movie studios, television studios, brand owners, and other content generators, may partner with administrators of the media content management system 100 such that licensed content may be delivered and stored in the media content store 106. In such a procurement process, content owners may provide media content items 104 having pre-populated attributes, as mentioned above. A media content source 124, such as a content owner, may include content stores or databases on servers maintained and operated by the third-party sources or websites, for example. As part of the procurement process, content items 104 may be categorized into one or more collections by storing them in association with one or more content associations from the content association store 118. In one embodiment, content associations may be automatically generated by the content associator module 108 based on attributes of the content items 104. In another embodiment, content associations may be selected through one or more user interfaces or through an application programming interface (API). In a further embodiment, media content items 104 may be content associated by users of the media content management system 100 after being stored in the media content store 106 through one or more user interfaces on user devices 102.

As further illustrated in FIG. 5A, a dynamic keyboard interface 122 may be provided on a user device 102 *b*, for example. A dynamic keyboard interface 122 may include media content items 104 as well as collections of media content items 104. For example, the dynamic keyboard interface 122 may include a collection of media content items 104 content associated as "#FOMO." "#FOMO" is an expression in Internet slang, meaning "fear of missing out." Thus, media content items 104 included in the "#FOMO" collection may be about or include expressive statements about the specific expression "fear of missing out." One or more expressive statements may, in one embodiment, be extracted and/or otherwise interpreted from a media content item 104. For example, a curating user may content association a media content item 104 as "#FOMO" based on images in the media content item 104 being related to the expression "fear of missing out," such as a blinking text of "FOMO" in the images, captioned dialog from a movie or television show indicating the character in the images is lonely, has no friends, or otherwise has a fear of missing out on cool events. Through the procurement process, expressive statements may be mapped to content associations in the media content management system 100. These expressive statements may correlate to a user's searching intent in performing a search via animated inputs in the dynamic interface, in one embodiment.

As illustrated in FIG. 5A, the dynamic keyboard interface 122 may also include other animated keys, or regions of the dynamic keyboard that implement animated inputs. Animated keys of two hands clasped in a handshake, a baby crying, a pair of glasses, a "#happy" content association, and a "#LOL" content association are illustrated as example animated keys, in addition to the "#FOMO" animated key further including a champagne bottle. Though not illustrated, the animated keys may include media content items 104 that are rendered in the dynamic keyboard interface 122 as animations, meaning the content may be moving in a constant loop within the keys. Media content items 104 may be preprocessed to enable the animated inputs in the dynamic interface, in one embodiment.

Upon selecting one of the animated keys in the dynamic keyboard interface 122, the user device 102 *b* may communicate with the media content management system 100 through a search interface module 120. In one embodiment, a user's search history and/or a user's sharing history may be stored as personalized information in a personalization store 150 for each user of the dynamic keyboard interface 122. Other personalized information may be captured about a user device 102, such as location (via GPS and/or IP Address), language keyboards installed, default language selection, phone information, contact information, messaging applications installed, and so forth. The data included in the personalization store 150 may be used as one or more factors by the search interface module 120 in determining the search intent of the user, for example. As further illustrated in FIG. 5B, the dynamic keyboard interface 122 may be rendered on the user device 102 *b* through a dynamic keyboard application 130 installed on the user device 102 *b*. The dynamic keyboard application 130 may install a dynamic keyboard user interface 132 that enables the dynamic keyboard interface 122 to be accessed throughout the user device 102 *b* as a third-party keyboard. In this way, a messaging user using a messaging application 140 and may access the dynamic keyboard interface 122 from within the messaging application 140.

Figure 5B:
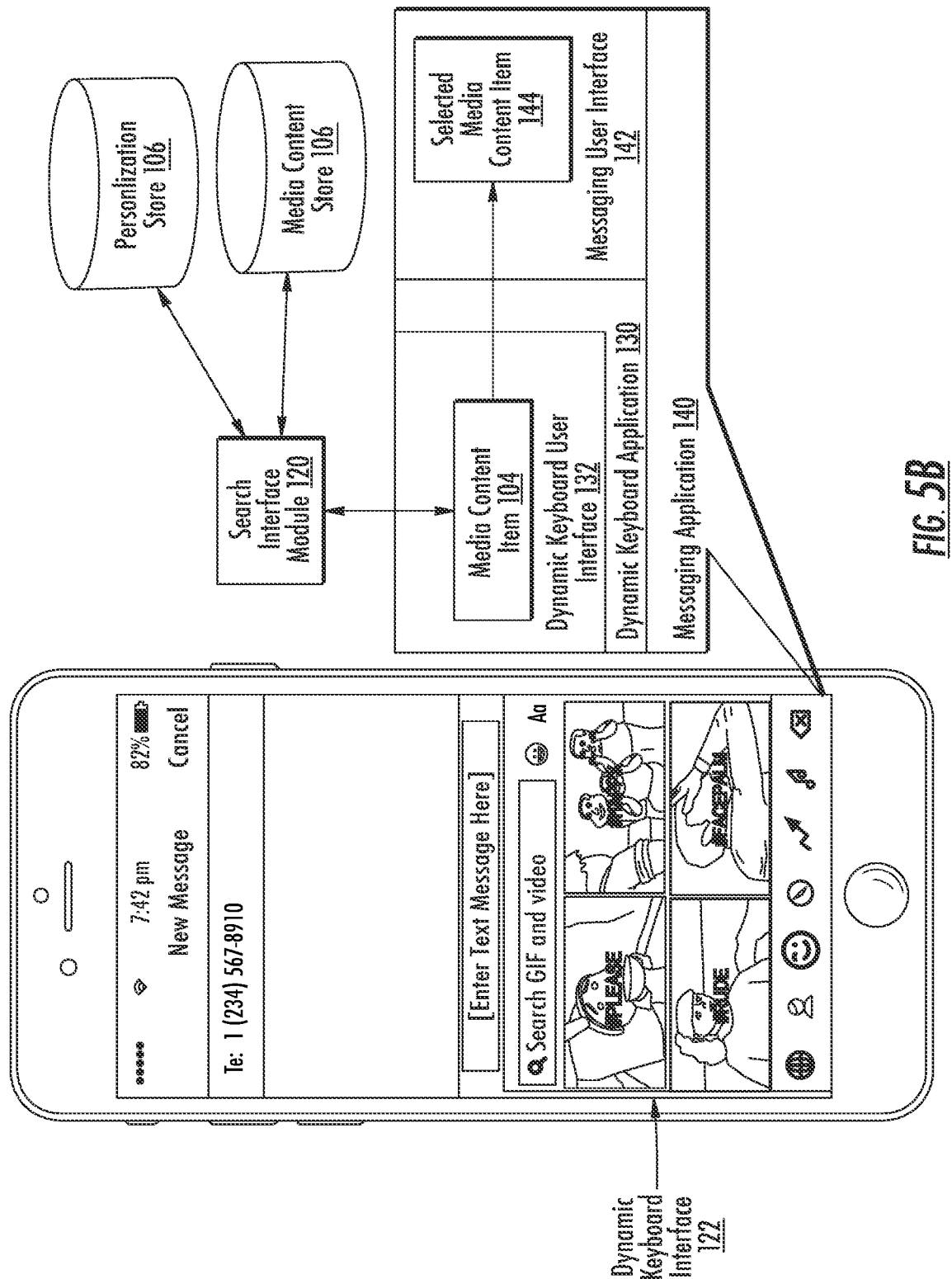
FIG. 5B is a high-level block diagram depicting a process of performing a search to implement animated inputs in a dynamic interface according to aspects of the present disclosure.

FIG. 5B is a high-level block diagram depicting a process of performing search to implement animated inputs in a dynamic interface, in an embodiment. As further illustrated in FIG. 5B, media content items 104 are rendered in the dynamic keyboard interface 122 through the dynamic keyboard user interface 132 communicating with the search interface module 120. In one embodiment, a set of collections may be selected for display on the dynamic keyboard interface 122. As illustrated in FIG. 1B, the dynamic keyboard interface 122 includes "#PLEASE," "#HAPPY," "#RUDE," and a "#FACEPALM" collections. Although the hashtag symbol (#') is used in the examples included here, content associations do not necessarily need to start with a hashtag. By selecting an animated key on the dynamic keyboard interface 122, the collection of media content items 104 may be retrieved from the media content store 106 by the search interface module 120 and then rendered by the dynamic keyboard user interface 132 in the dynamic keyboard interface 122. In this way, the searching user is searching the media content management system 100 by using the selected content association, such as "#HAPPY." The retrieved collection of media content items 104 may be rendered within the dynamic keyboard interface 122. Because the "#HAPPY" collection may be updated and added to in real-time, a searching user may be presented with different media content items 104 as new items are added to the collection. As mentioned above, media content items 104 may be preprocessed to reduce the file size of the content, thus enabling the media content items 104 to be quickly rendered on the dynamic keyboard interface 122.

A searching user may then select a media content item from the dynamic keyboard interface 122 by touching or otherwise interacting with the dynamic keyboard user interface 132. The selected media content item 144 may then be transmitted or pasted into the messaging user interface 142 of the messaging application 140. In one embodiment, a selected media content item 144 is selected by clicking, tapping, or touching the dynamic keyboard interface 122 and holding the selected media content item 144 to "copy" the content so that it can be "pasted" into the messaging application 140 through the messaging user interface 142. This copy and paste method may take advantage of the operating system of the user device 102, in one embodiment, such that the selected media content item 144 is not stored permanently onto the user device 102. In another embodiment, a searching user may search for media content through a search field on the dynamic keyboard interface 122, described further herein. In this way, media content items 104 may be shared through any messaging platform available on the user's device. Personalized information may also be captured, as mentioned above, in the personalization store 150 through the search interface module 120, for example. In at least some embodiments, a dynamic keyboard interface 122 can be implemented as a GIF keyboard, as produced by RIFFSY, INC. of San Francisco, Calif.

Figure 6A:
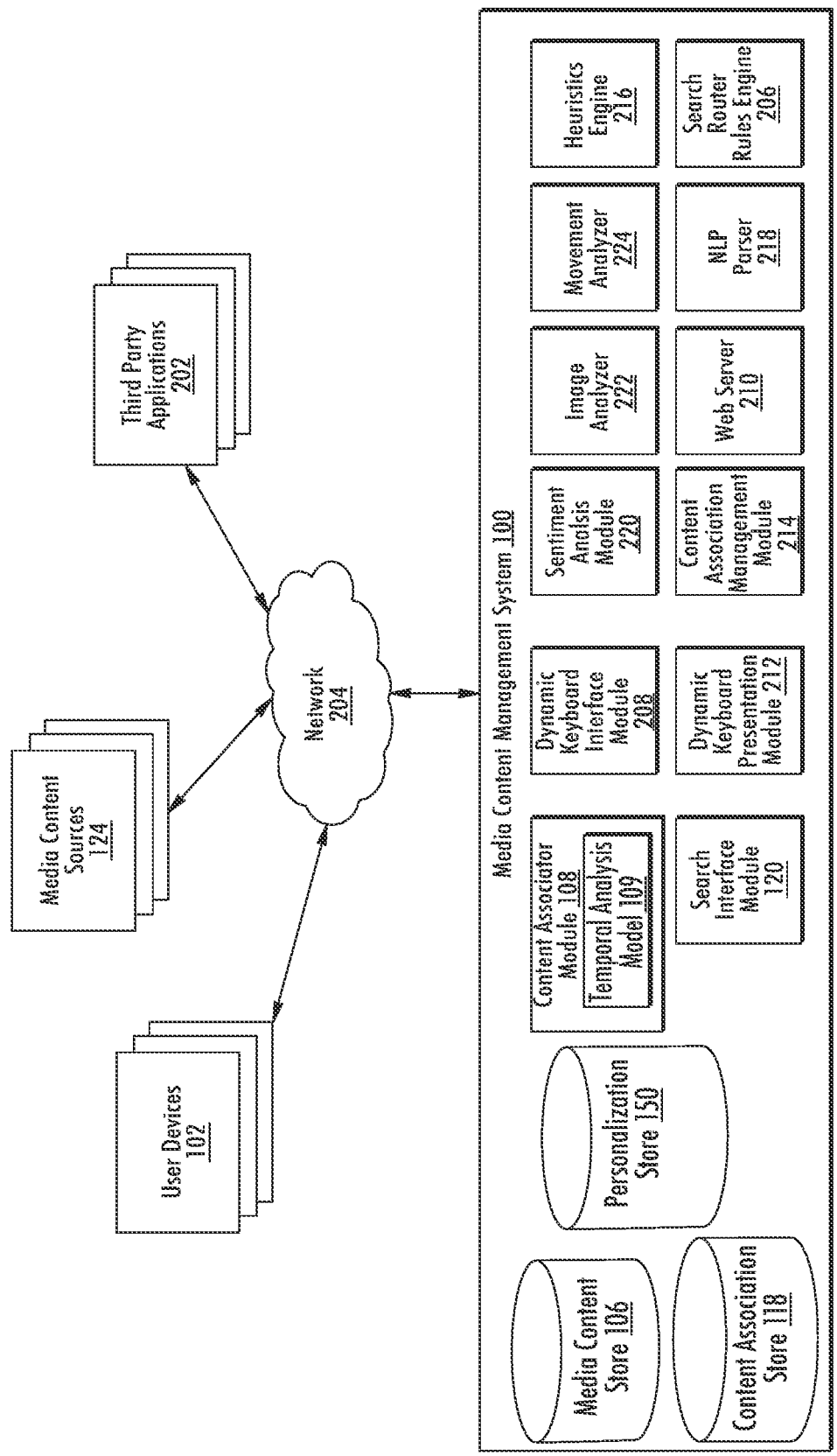
FIG. 6A is a network diagram of a system for procuring, organizing, and retrieving expressive media content in a media content management system, showing a block diagram of the media content management system, according to an embodiment according to aspects of the present disclosure.

FIG. 6A is a network diagram of a system for categorizing procured content for performing search in a media content management system, showing a block diagram of the media content management system, according to an embodiment. The system environment includes one or more user devices 102, media content sources 124, third-party applications 202, the media content management system 100, and a network 204. In alternative configurations, different and/or additional modules can be included in the system.

The user devices 102 may include one or more computing devices that can receive user input and can transmit and receive data via the network 204. In another embodiment, the user device 102 can be a device having computer functionality, such as a personal digital assistant (PDA), mobile telephone, smart-phone, wearable device, etc. The user device 102 is configured to communicate via network 204. The user device 102 can execute an application, for example, a browser application that allows a user of the user device 102 to interact with the media content management system 100. In another embodiment, the user device 102 interacts with the media content management system 100 through an application programming interface (API) that runs on the native operating system of the user device 102.

In one embodiment, the network 204 uses standard communications technologies and/or protocols. Thus, the network 204 can include links using technologies such as Ethernet, 802.11, worldwide interoperability for microwave access (WiMAX), 3G, 4G, CDMA, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 6A contains a block diagram of the media content management 100. The media content management system 100 includes a media content store 106, a content association store 118, a personalization store 150, a search interface module 120, a content associator module 108, a dynamic keyboard interface module 208, a web server 210, a dynamic keyboard presentation module 212, a content association management module 214, a sentiment analysis module 220, an image analyzer module 222, a movement analyzer 224, a natural language processing (NLP) parser 218, a heuristics engine 216, and a search router rules engine 206. In other embodiments, the media content management system 100 may include additional, fewer, or different modules for various applications. Conventional components such as network interfaces, security functions, load balancers, failover servers, management and network operations consoles, and the like are not shown to not obscure the details of the system.

The web server 210 links the media content management system 100 via the network 204 to one or more user devices 102; the web server 210 serves web pages, as well as other web-related content, such as Java, Flash, XML, and so forth. The web server 210 may provide the functionality of receiving and routing messages between the media content management system 100 and the user devices 102, for example, instant messages, queued messages (e.g., email), text and SMS (short message service) messages, or messages sent using any other suitable messaging technique. The user can send a request to the web server 210 to upload information, for example, images or media content are stored in the media content store 106. Additionally, the web server 210 may provide API functionality to send data directly to native user device operating systems.

A content associator module 108 may automatically generate one or more content associations for a media content item 104 in the media content management system 100 based on the attributes of the media content item 104. For example, machine learning techniques may be used by the content associator module 108 to determine relationships between media content items 104 and content associations stored in the content association store 118.

The content associator module 108 may include one or more temporal analysis models 109, for example as described above with reference to the temporal analysis model 86 of FIG. 2. The content associator module 108 may receive data that describes text recognized in one or more image frames of the media content item from the NLP parser 218 (e.g., text recognition data 89 of FIG. 2). This data may be input into the temporal analysis model 86.

The content associate module 108 may be configured to analyze the media content items 104 and generate content associations for the media content items 104 based on temporal analysis data extracted from the media content items.

In one embodiment, the content associator module 108 may identify one or more content sources, such as movie studios, movies, television studios, television shows, actors, genres, and so forth. In another embodiment, the content associator module 108 may automatically generate a content association for a media content item 104 based on an analysis of the image frames within the media content item 104. In yet another embodiment, the content associator module 108 may use one or more computer vision techniques and other image processing methods. For example various third-party applications 202 may be employed to analyze the image frames within the media content item 104 and automatically generate one or more content associations to be associated with the content item. In one embodiment, the content associator module 108 may utilize one or more third party applications 202, the NLP parser 218, the sentiment analysis module 220, the image analyzer 222, the movement analyzer 224 and the heuristics engine 216 to analyze and parse text included in media content items 104 as well as analyze moving image frames of the media content items 104 to automatically generate content associations and/or automatically select content associations stored in the content association store 118. In another embodiment, an NLP parser 218 may be combined with a sentiment analysis module 220 and may be relied upon to analyze images and/or audiovisual content to determine a sentiment of the media content items 104. For example, an image analyzer 222 and a movement analyzer 224 may be used to detect and/or classify a sequence of images depicting a face smiling. A heuristics engine 216 may include a rule that automatically associates a media content item 104 having a sequence of images that have been analyzed to detect a smile with a "#happy" content association from the content association store 118 as the media content item 104 is stored within the media content store 106 in the media content management system 100. Alternatively, or in addition to this analysis, an NLP parser 218 may parse text strings included in the images and determine a match to the word "AWESOME." Additionally, the NLP parser 218 may interpret the smile to mean a positive sentiment. A sentiment analysis module 220 may indicate that the word "AWE- SOME" is associated with a strong positive sentiment, and a heuristics engine 216 may include a rule that automatically associates the "#happy" content association (and/or other positive content associations) with media content items 104 that have a strong positive sentiment.

A search interface module 120 may manage search requests and/or search queries for media content items 104 in the media content management system 100 received from user devices 102, in an embodiment. A search query may be received at the search interface module 120 and processed by a search router rules engine 206, in one embodiment. In another embodiment, a search interface module 120 may receive a request for a collection from a user device 102 based on a content association, such as "#HAPPY," "#RUDE," "#FOMO," and so forth as a result of a selection of an animated key or a text search. The search interface module 120 may communicate the search query to the search router rules engine 206 to process the request, in an embodiment.

A content association management module 214 may manage one or more content associations associated with each media content item 104 in the media content management system 100. Content associations may be associated with media content items 104 through the content association management module 214 through various interfaces, such as user interfaces and application programming interfaces (APIs). APIs may be used to receive, access, and store data from media content sources 124, third party applications 202 (and/or websites), and user devices 102. The content association management module 214 may manage how content associations are associated with the media content items 104 through various procurement methods, in one embodiment.

A dynamic keyboard interface module 208 may manage interface communications between the media content management system 100 and user devices 102. For example, the dynamic keyboard interface 122, as illustrated in FIGS. 5A and 5B, may include a menu selection element that enables the searching user to view trending media content on the media content management system 100. "Trending" media content may include frequently viewed and/or frequently shared content by users of the media content management system 100. The dynamic keyboard interface module 208 may receive the request for trending media content and retrieve media content items 104 from the media content store 106 that have the highest number of shares in the past hour, for example. The dynamic keyboard interface module 208 may then, through the dynamic keyboard presentation module 212, provide the retrieved trending media content items to the dynamic keyboard interface 122 through the dynamic keyboard application 130, in one embodiment. The dynamic keyboard presentation module 212 may determine how the media content items are presented and in what order, for example. In one embodiment, if no media content items 104 satisfy a search query or request from a user device, the dynamic keyboard interface module 208 may, in conjunction or in coordination with the search interface module 120 and search router rules engine 206, deliver other media content items 104 that are popular or have been shared. In one embodiment, content items may be selected by the dynamic keyboard interface module 208 from third party applications 202 (or websites), to be included in the search results or animated keys of the dynamic keyboard interface 122.

A heuristics engine 216 may include one or more heuristics rules to determine one or more outcomes. For example, the content associator module 108 may use the heuristics engine 216 to determine a ranking of candidate content associations for a media content item 104 based on the attributes of the media content item 104. Certain attributes may have various heuristic rules associated with them, such as visual movements (e.g., detected smiles may be associated with a "#HAPPY" content association), visual characteristics (e.g., blinking text may indicate an importance of the text string, or a hashtag symbol may indicate a particular content association), content sources, characters included in the media content item, and other attributes. Various heuristic rules may be generated by administrators to automatically generate content associations for content items based on attributes, in one embodiment. In another embodiment, heuristic rules may also use ranges of parameters for various attributes. For example, thirty selections of a media content item 104 for sharing by a particular user may be used in a heuristic rule to present the same media content item in response to a search query from the particular user where there are few search results. The range here may be defined as a threshold number of shares, for example.

A sentiment analysis module 220 may provide analysis of various text received by the media content management system 100 to determine whether the text exhibits positive, negative, or neutral connotations. This information may be used by various modules to efficiently translate a search query to extract the expressive intent of the searching user. For example, a dictionary of terms may be used, in multiple languages, to determine whether text may be determined to have positive, negative, or neutral connotations. The sentiment analysis module 220 may, in one embodiment, use various third party applications 202 to perform this analysis. Using the sentiment analysis module 220, the search router rules engine 206 may provide one or more collections of media content items 104 based on the connotations of the search query, for example.

Figure 6B:
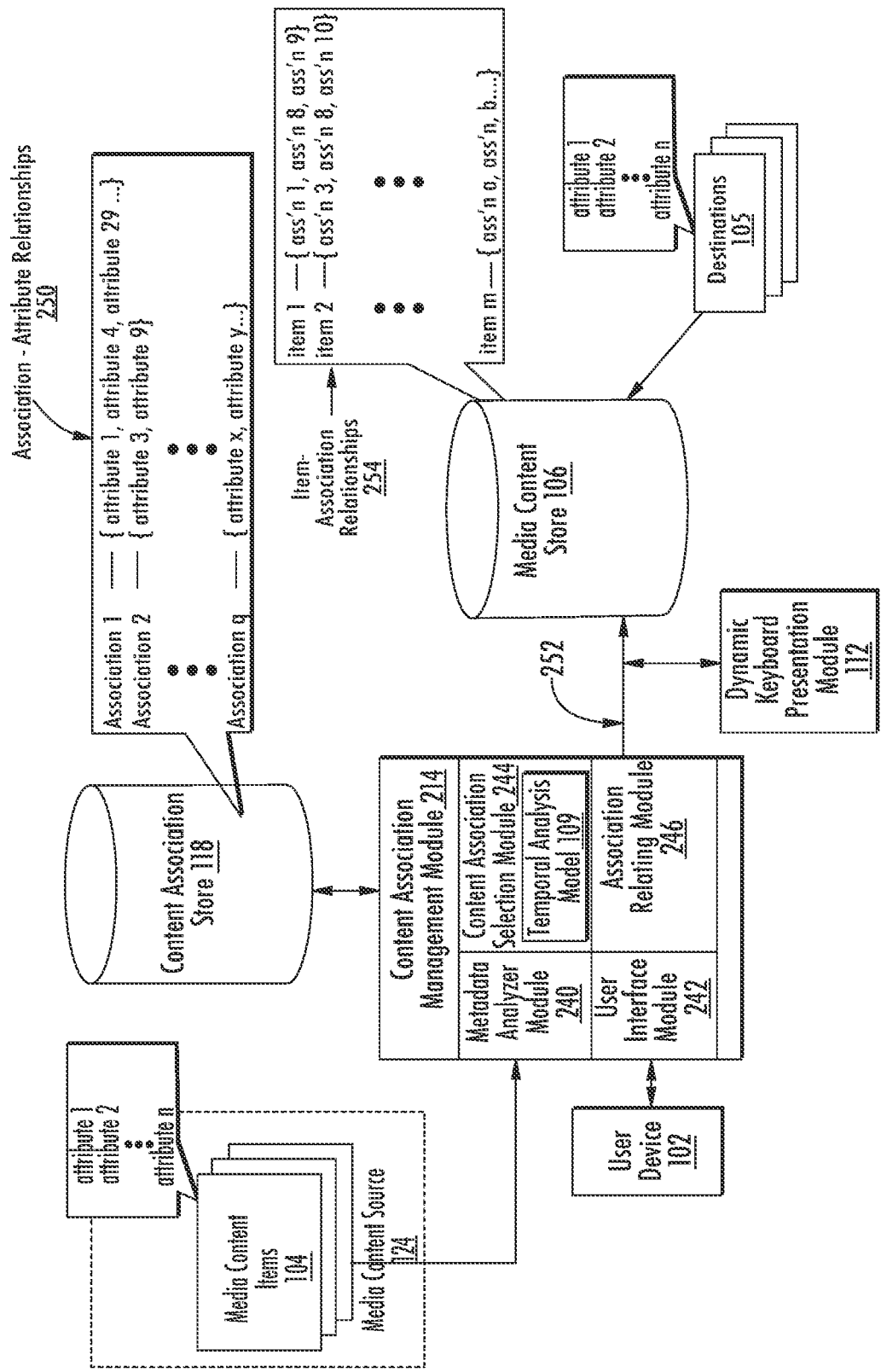
FIG. 6B is a high-level block diagram of a system for categorizing procured content for performing search in a media content management system according to an embodiment, according to aspects of the present disclosure.

FIG. 6B is a high-level block diagram of a system for categorizing procured content for performing search in a media content management system, according to an embodiment. A content association management module 214 may include a metadata analyzer module 240, a user interface module 242, a content association selection module 244, and an association relating module 246, in one embodiment.

As media content items 104 having one or more attributes are received in the media content management system 100 from a media content source 124, a metadata analyzer module 240 may generate one or more content associations based on the attributes of the media content items 104. For example, media content items 104 from a particular movie may be automatically content associated in a collection for that particular movie based on a movie metadata attribute associated with the media content items 104. In one embodiment, administrators of the media content source 124 may associate one or metadata attributes to the media content items 104. Metadata attributes may be stored in various ways in the source files of the media content items 104, such as header content associations within the source files, as well as other files associated with the source files, such as XML files describing content items being procured in batches by the media content system 100.

The metadata analyzer module 240 may parse through the metadata associated with media content items 104 and automatically generate and/or select content associations from the content association store 118 based on one or more rules, in one embodiment. As illustrated in FIG. 6B, the content association store 118 may store association-attribute relationships 250, such that attributes have been associated with content associations. In this way, the metadata analyzer module 240 may automatically assign a content association to a media content item 104 based on the association-attribute relationships 250 stored in the content association store 118.

Other metadata attributes that may be analyzed by the metadata analyzer module 240 includes an Internet Protocol (IP) address of the mobile device or user device used by a searching user or curating user. An IP address may provide an indication of a geographic location of a user, including country of origin. Alternatively, a Global Position System (GPS) of a mobile device may include a current geographic location of the user. As a result, different collections or content associations may be presented to the user based on the predominant language spoken at the geographic location of the user. In another embodiment, another metadata attribute that may be analyzed by the metadata analyzer module 240 includes the one or more languages selected by the viewing user. In this way, language preference may help inform searching intent, curating intent, or both. A word in French, for example, may have a completely different meaning in Indonesian. As a result, language and country of origin may be a metadata attribute that may be determined by a metadata analyzer module 240.

A user interface module 242 may provide one or more user interfaces for a user device 102, such as a computer or mobile device, to select one or more content associations for procured media content items 104. For example, a curating user may be given the ability to assign one or more content associations from the content association store 118 to media content items 104. In this way, the content association management module 214 enables manual selection of content associations for categorizing the procured media content items 104.

A content association selection module 244 may provide one or more content associations from the content association store 118 in one or more user interfaces provided by the user interface module 242, according to an embodiment. In one embodiment the content association selection module 244 may present predicted content associations based on the content association-attribute associations 250 stored in the content association store 118 for selection and/or confirmation by a curating user operating a user device 102. For example, a media content item 104 may have a genre attribute of comedy based on pre-populated information from the media content source 124. Because the "comedy" attribute may be associated with a "#HAPPY" content association, the media content item 104 may have been assigned the "#HAPPY" content association by the metadata analyzer module 240, in one embodiment. The content association selection module 244 may present the "#HAPPY" content association along with other related content associations in a user interface provided by the user interface module 242 for a curating user to assign or revoke content associations associated with the associated content item 104. The association-attribute associations 250 stored in the content association store 118 may include content associations that are related to other content associations, in one embodiment. For example, a "#HAPPY" content association may be related to a "LOL" and a "LMAO" content association because both LOL and LMAO include a "laughing" interpretation. As a result, other content associations may be presented for selection by a curating user, in one embodiment.

The content association selection module 244 may include one or more temporal analysis models 245, for example as described above with reference to the temporal analysis model 86 of FIG. 2. The content association selection module 244 may be configured to analyze the media content items 104 and generate content associations for the media content items 104 based on temporal analysis data extracted from the media content items 104.

As part of the procurement process, media content items may be preprocessed 252 before being stored in the media content store 106. This enables the media content items 104 to be retrieved quickly and rendered seamlessly in the dynamic keyboard interface 122 on a user device 102. Pre-processing of media content items 252 may include reducing pixel count, modifying resolution definition, and other file size reduction techniques. The dynamic keyboard presentation module 212 may be used to perform this pre-processing of media content items 252, in one embodiment. Beneficially, pre-processing of media content items 252 enables a dynamic keyboard interface 122, presented to a user on a user device 102 *b*, to render at least two renderings of at least two media content items in animation and to display them concurrently in the dynamic keyboard interface 122.

An association relating module 246 may relate content associations to media content items 104 in the media content store 106. Content associations may be associated to content items automatically by a metadata analyzer module 240 (or other modules in the media content management system 100) or the content associations may be associated as a result of a selection of content associations received through a user interface provided by the user interface module 242. As illustrated in FIG. 6B, item-association relationships 254 are stored in the media content store 106. Each content item may have a content identifier and each content association may have a content association identifier such that the item-association relationships 254 may be stored in the media content store 106. As illustrated in FIG. 6B, a content item ("item") may be related to one or more associations ("ass'n"), and the item-association relationships 254 are stored in the media content store 106, for example.

Figure 6C:
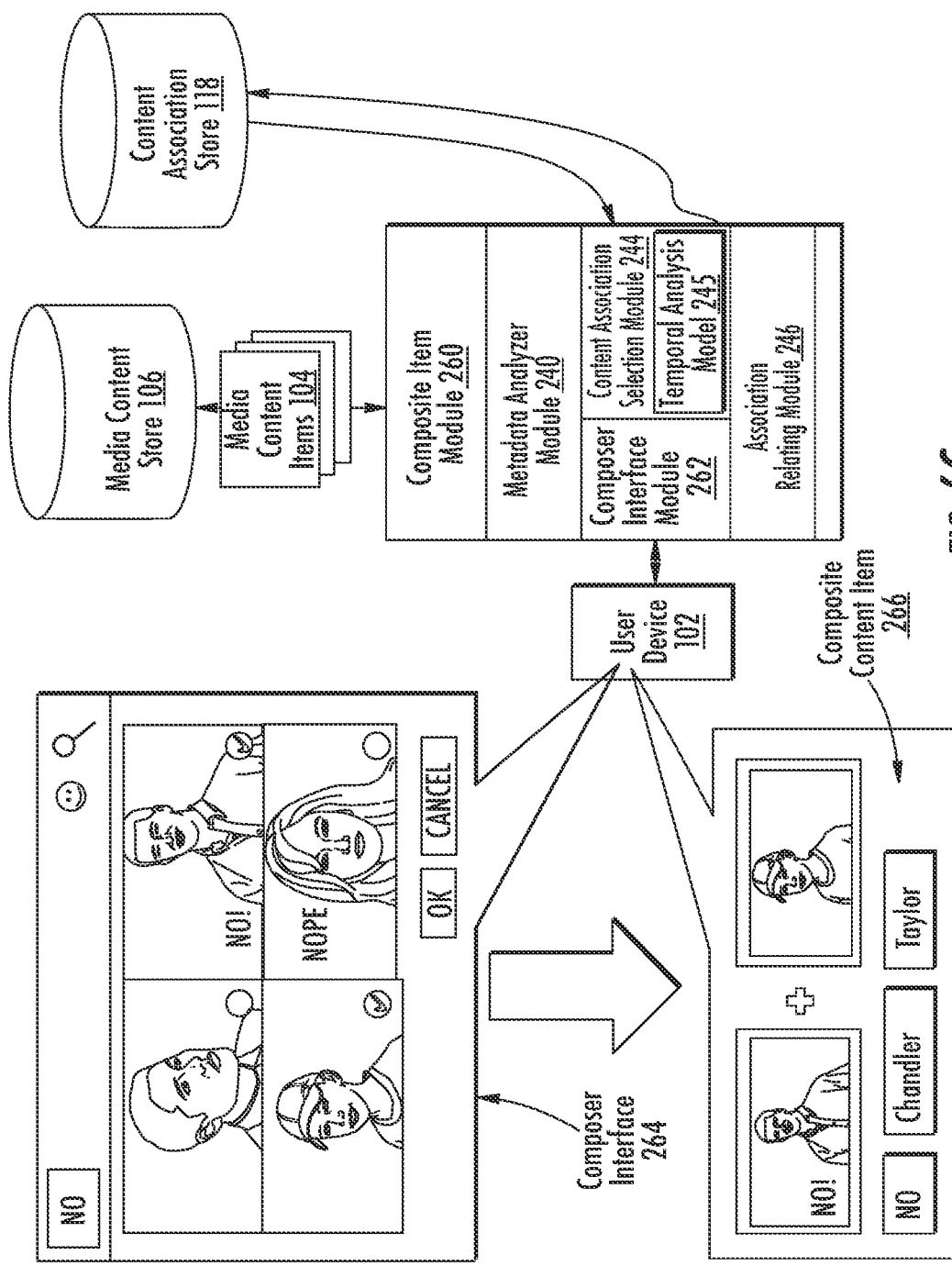
FIG. 6C is a high-level block diagram of a system for composing a composite content item in a media content management system according to aspects of the present disclosure.

FIG. 6C is a high-level block diagram of a system for composing a composite content item in a media content management system, according to an embodiment. A composer interface 264 may be provided on a user device 102 that enables a viewing user to search media content items 104 and select two or more content items to generate a composite content item. As illustrated, two content items have been selected in the composer interface 264 to create a composite content item 266 having the combined attributes of the two selected content items. For example, a viewing user may search for "No" through a search interface, described in more detail later. Several content items 104 may be retrieved that meet the search term, "No." A first selected content item may have been associated with content associations of "No" and "Chandler" while a second selected content item may have been associated with content associations of "No" and "Taylor." As a result, the composite content item 266 may include the content associations "No," "Chandler," and "Taylor." The composite content item 266 may be received by a composer interface module 262 and stored by the composite item module 260 as a media content item 104 in the media content store 106. As further illustrated in FIG. 6C, a composite item module 260 may operate in conjunction with, or include, a metadata analyzer module 240, a content association selection module 244, and an association relating module 246 that operate similarly as described above, in addition to a composer interface module 262.

The content association selection module 244 may include one or more temporal analysis models 245, for example as described above with reference to the temporal analysis model 86 of FIG. 2. The content association selection module 244 may be configured to analyze the media content items 104 and generate content associations for the media content items 104 based on temporal analysis data extracted from the media content items 104.

In at least some embodiments, a composite content item 266 may be associated with an expressive statement that conveys a different meaning than the individual content items included in the composite content item 266. Returning to the example above, a first content item 104 with the character "Chandler" expressing the statement, "No," may convey a particular meaning to most users of the media content management system 100. A curating user of the media content management system 100 may associate other content associations with that particular content item 104, such as "#cool" and "FRIENDS." The second content item 104 depicting a celebrity, TAYLOR LAUTNER, may evoke a separate and different meaning from the first content item 104 depicting the character "CHANDLER" from the television show, FRIENDS. The second content item 104 may be content associated, automatically or manually, with a content association of "cool" and/or "famous," for example, in addition to the shared content association of "No." As a result, the combination of the two media content items presents information different than each of the media content items presented separately. In one embodiment, the expressive statement presented by the composite content item 266 may be a simple conglomeration of the content associations associated with the individual content items included in the composite content item 266. In another embodiment, an expressive statement that is different from the content associations included in the individual content items may be extracted or otherwise interpreted from the composite content item 266. This expressive statement, as stored by the associated content associations associated with the composite content item 266, will be used in correlating a searching user's intent to relevant content items, as described herein.

Figure 7A:
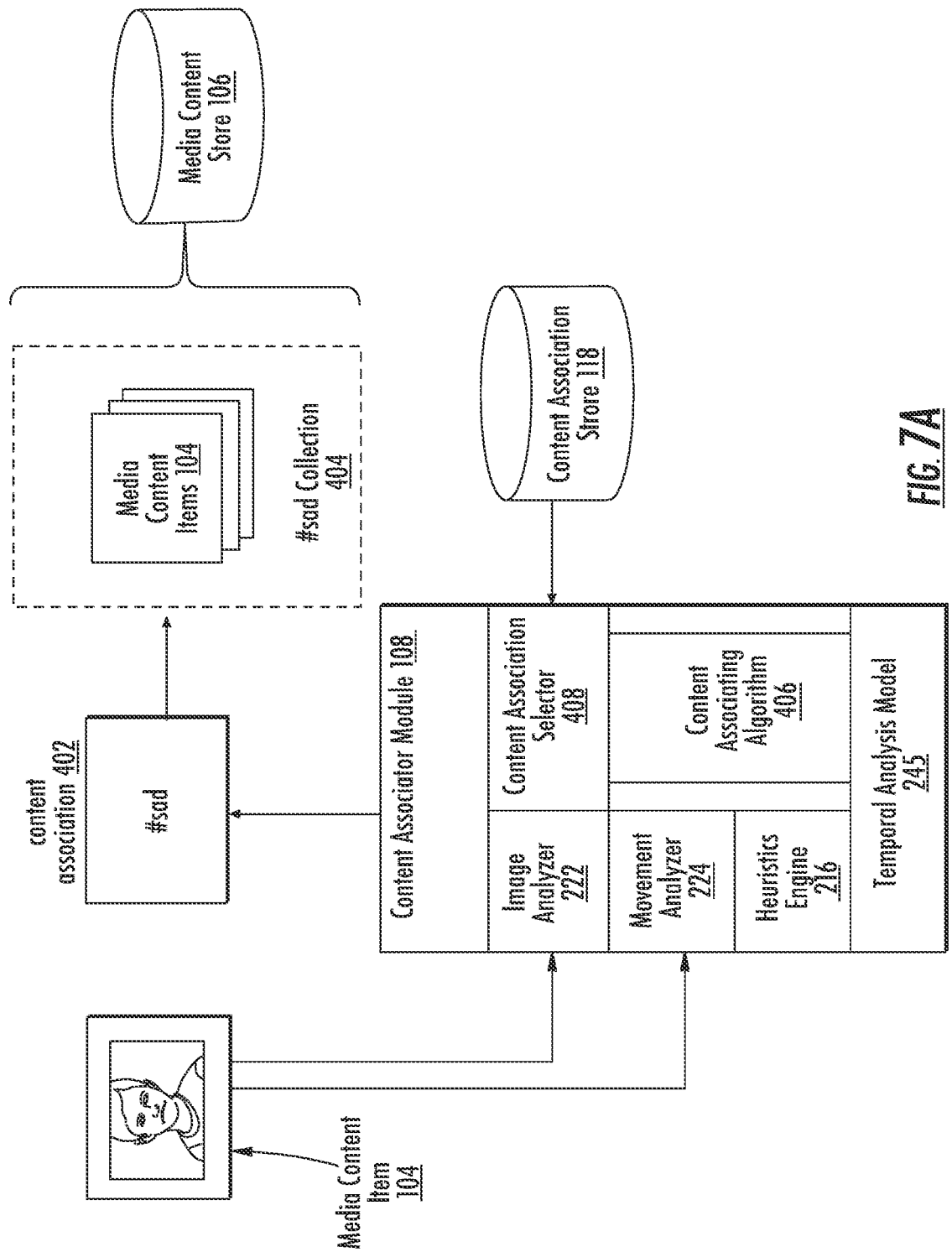
FIG. 7A is a high-level block diagram of a system for categorizing procured content in a media content management system according to aspects of the present disclosure.

FIG. 7A is a high-level block diagram of a system for categorizing procured content in a media content management system, according to some examples. A content associator module 108 may include a content associating algorithm 406 for automatically selecting a content association 402 for a media content item 104. The content associator module 108 may further include a content association selector 408 for selecting the content association 402 from the content association store 118. The content associator module 108 may operate in conjunction with or include an image analyzer 222, a movement analyzer 224, and a heuristics engine 216 to aide in automatically selecting a content association 402 for a media content item 104.

The content associator module 108 may include one or more temporal analysis models 245, for example as described above with reference to the temporal analysis model 86 of FIG. 2. The content associator module 108 may be configured to analyze the media content items 104 and generate content associations for the media content items 104 based on temporal analysis data extracted from the media content items 104.

An image analyzer 222 may include computer vision techniques that recognize facial features, such as a face, eyes, a mouth smiling, a mouth frowning, and so forth. An image analyzer 222 may further include other computer vision techniques and/or pattern recognition algorithms to create baseline training sets for recognizing these facial characteristics. Similarly, a movement analyzer 224 may include computer vision techniques and/or pattern recognition algorithms, as well as machine learning and Bayesian inference techniques to recognize crying, laughing, falling, and other actions that may be modeled in similar ways. A movement analyzer 224 may also include eye-tracking functionality to identify a location of eyes within a set of images or an animated image. The eye-tracking functionality of the movement analyzer 224 may be used in conjunction with one or more other modules in the media content management system 100 to generate a new media content item 104, such as rendering a pair of sunglasses onto the animated set of images over the detected eyes within the images, for example. Other modules may be used to add text to media content items 104, such as the phrase "deal with it" to create and/or generate new media content items 104. A heuristics engine 216, as described earlier, may use various rules to arrive at conclusions based on received data. For example, as illustrated in FIG. 7A, a media content item 104 may include a GIF of a baby crying, for example. An image analyzer 222 may analyze the frames of the GIF of the media content item 104 and determine facial characteristics such as a pair of eyes squinting, a mouth open in a frown-like position, and eyebrows raised. A movement analyzer 224 may identify that the media content item 104 includes a baby crying based on baseline models of babies crying and other machine learning techniques.

As a result, the content associator module 108 may select one or more content associations from a content association store 118, through a content association selector 408. The content associating algorithm 406 may include one or more heuristic rules from a heuristics engine 216 to automatically generate a content association for a media content item 104. In this example, a "#sad" content association 402 has been selected for the media content item 104. As described earlier, content associations may be associated with other content associations, such as a crying content association may be associated with a "#sad" content association 402. In this way, the media content item 104 of a baby crying may be included in the "#sad" collection 404 based on the automatically generated content association and stored in the media content store 106.

Figure 7B:
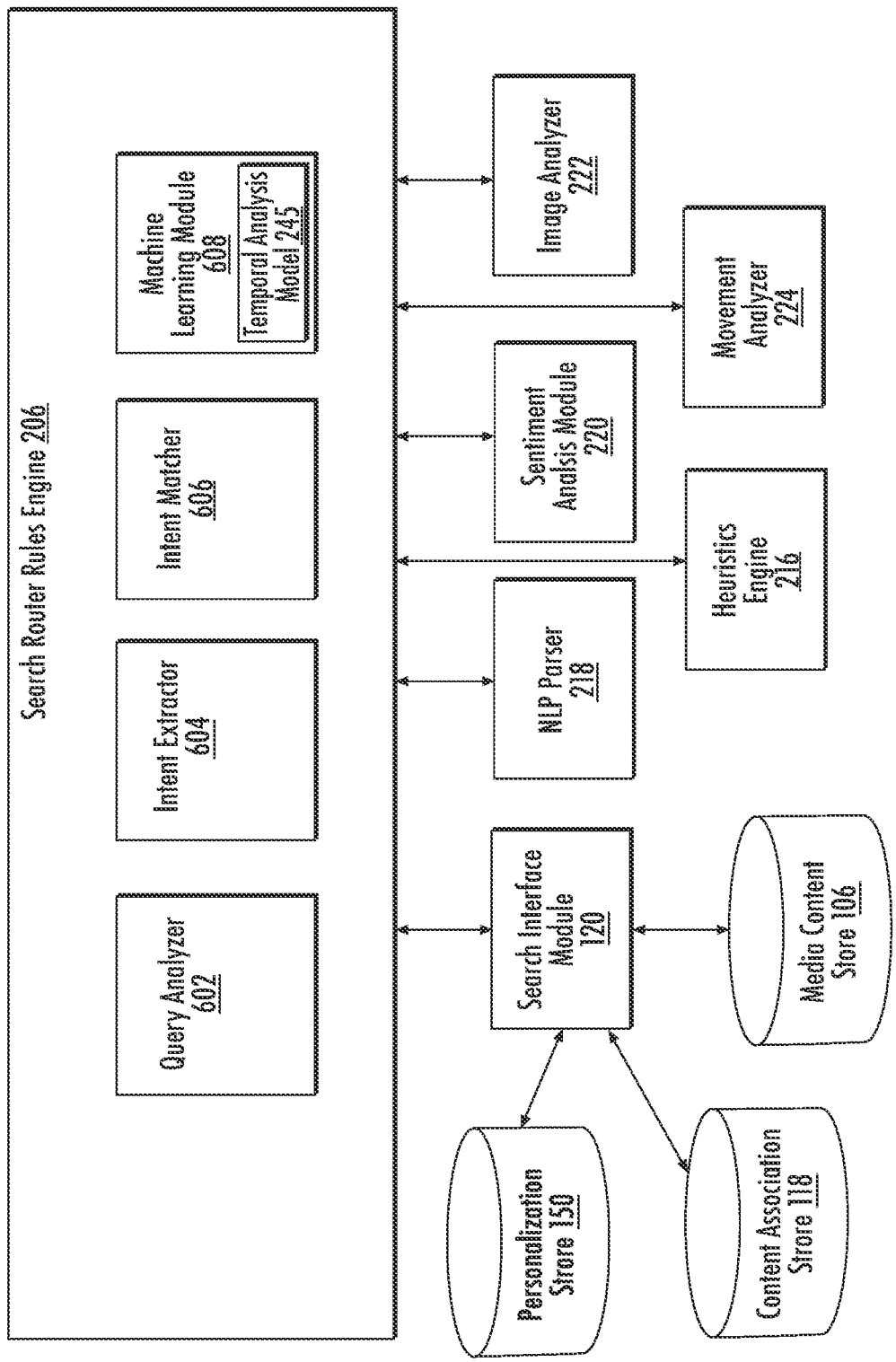
FIG. 7B is a high-level block diagram of a system for performing search to implement animated inputs in a dynamic interface according to aspects of the present disclosure.
Figure 8A:
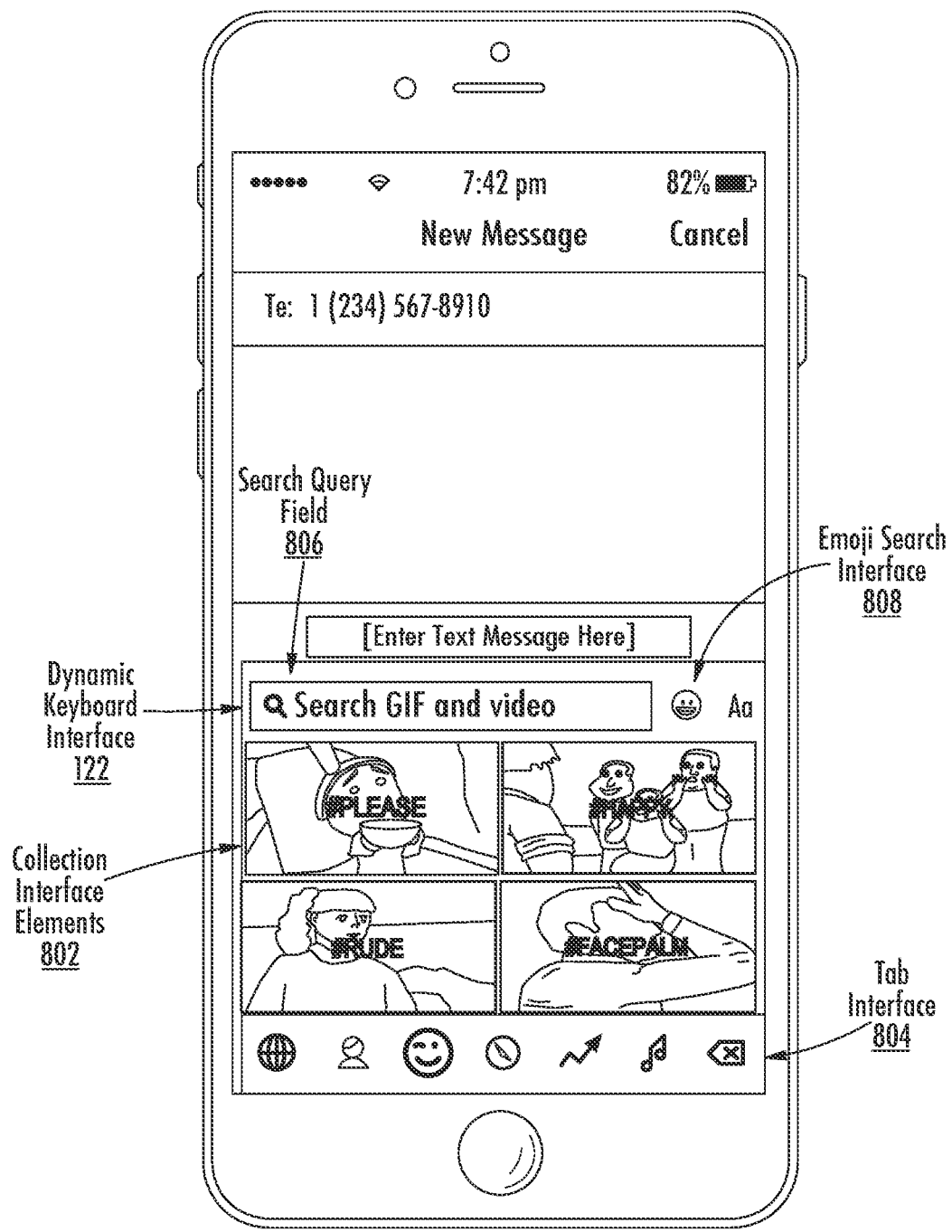
Figure 8C:
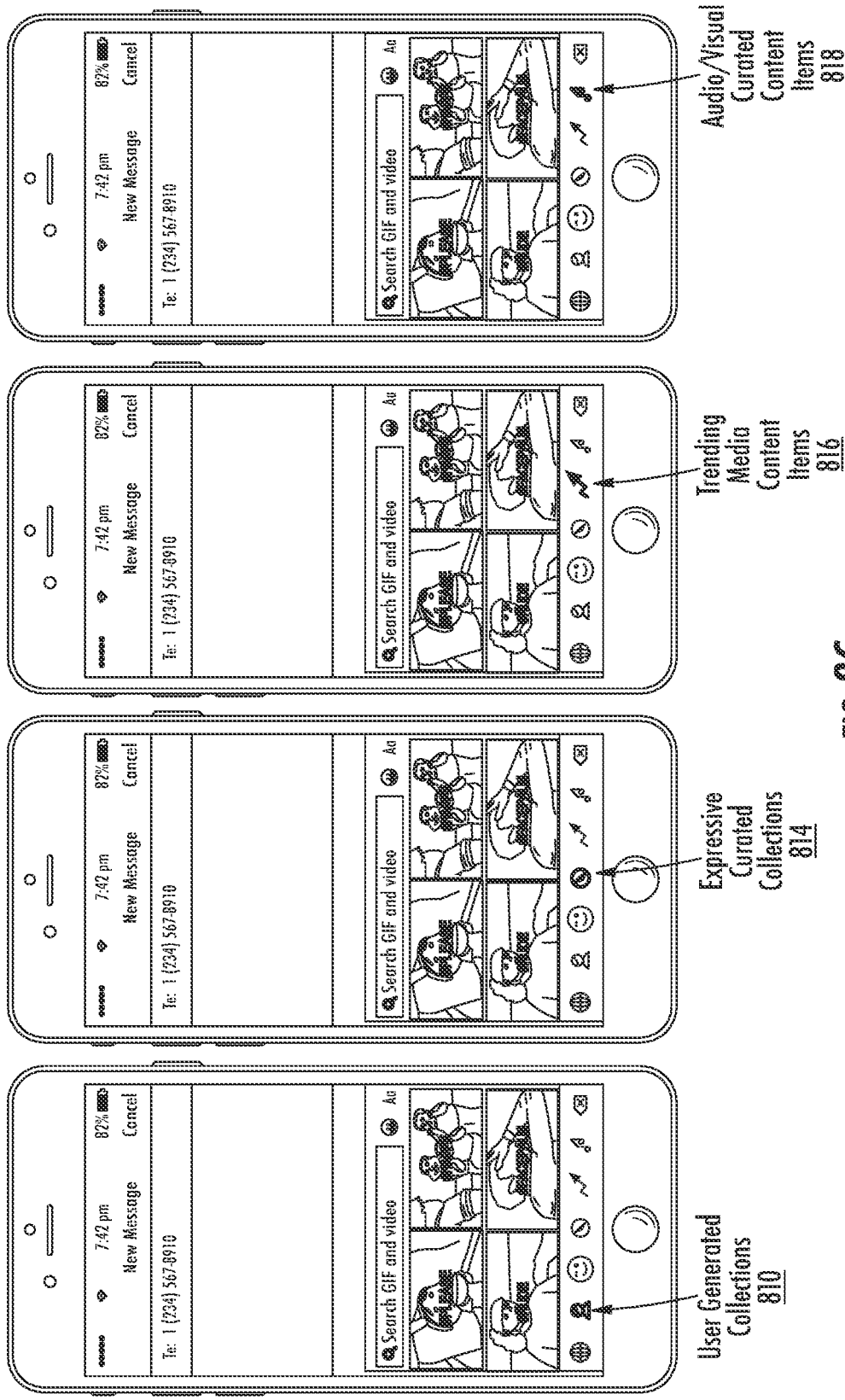

FIG. 7B is a high-level block diagram of a system for performing search to implement animated inputs in a dynamic interface, according to some examples. A search router rules engine 206 may include a query analyzer 602, an intent extractor 604, an intent matcher 606, and a machine learning module 608. A query analyzer 602 may breakdown received text and/or picture into overlapping windows, in one embodiment. For example, a searching user may enter the search term "happy birthday" as a query. The query analyzer 602 may breakdown the query into words and partial words that overlap, such as "ha," "happy," "birth," "birthday," "happy birth," and "happy birthday." The query analyzer 602 may provide the words and partial words to the search interface module 120 for searching in the media content store 106 based on the words and partial words on the content associations of the associated media content items, in one embodiment.

In another embodiment, the query analyzer 602 may provide the words and partial words to the intent extractor 604. For example, the intent extractor 604 may have previously mapped or extracted intent from the query "happy birthday" to include an intent to celebrate a birthday. Thus, the term "happy birthday" may specifically be mapped only to content items having birthday elements, such as a cake, candles, the text string "happy birthday," a party, a person blowing out candles, and the like. The intent extractor 604 may further provide the words and partial words to a natural language processing (NLP) parser 218 to derive meaning and/or intent from the search terms. An NLP parser 218 may be particularly useful, in one embodiment, where a search term is unrecognized. For example, if the search term were "happy dia de los muertos" and the terms "dia de los muertos," Spanish for "day of the dead," were not included in a dictionary or corpus of learned terms, the intent extractor 604 may extract the intent of the searching user wishing to celebrate something happy based on the word "happy" being included in the search query. If, on the other hand, "muertos" is included in a dictionary or text strings included as metadata attributes of content items, then the NLP parser 218 may be relied upon to present content items associated with both the "happy" and "muertos" content associations.

An intent matcher 606 may, in one embodiment, be used in the search router rules engine 206 to match an intent of a searching user to one or more content associations in a content association store 118. Returning to the previous example, the term "happy" included in the search query "happy dia de los muertos" may cause the search query to be matched by the intent matcher 606 to a "#happy" content association for further queries. The term "muertos" may be matched to a "dead" content association and a "Halloween" content association, in one embodiment. Because "dia de los muertos" is not directly related to Halloween, but is actually a Mexican holiday occurring on November 1, some content items may not be presented. An intent matcher 606 may adjust the matches, in one embodiment, between search phrases and content associations, in one embodiment. The matches may be stored in the content association store 118, in one embodiment.

In another embodiment, the intent matcher 606 may, in conjunction with a machine learning module 608, analyze user feedback, such as selecting content items having both a "Halloween" attribute and a "skull" attribute when those items are presented in search results in response to the "happy dia de los muertos" search query. As a result, the intent matcher 606 may generate a new match between the search phrase "happy dia de los muertos" and content items having both the "Halloween" and "skull" content associations. In one embodiment, the intent matcher 606 may determine a likelihood score of intent match based on probabilistic methods and/or machine learning for each match. This score may be stored in the content association store 118 for each intent match. These scores may be further based on statistical inference algorithms as provided by the NLP parser 218 and machine learning module 608.

A machine learning module 608 may use various machine learning methods, such as supervised and unsupervised learning methods, Bayesian knowledge base, Bayesian network, nearest neighbor, random walk, and other methods to determine various outcomes based on received training data and received user feedback (based on whether viewing users selected/shared content items presented in a search result set). For example, sometimes a random content item is presented along with the content items having a certain attribute, such as the "#happy" content association. Other times, the same content item may be presented randomly among search results for a different content association, such as "dog." The randomly presented content item may not be associated with either the "#happy" content association or the "dog" content association, but searching and/or viewing users may frequently select and share the randomly presented content item. As a result, a machine learning module 608 may determine that the randomly presented content item is selected 80% of the time overall, 70% of the time when presented with content associated as "#happy," and 60% of the time when presented with content associated as "dog."

The machine learning module 608 may be used to further automate the process and create a heuristic rule to automatically present the content item when a search query includes both terms "#happy" and "dog," as well as when a search query includes one of the terms. In one embodiment, a machine learning module 608 may associate, or relate, a content association to a content item based on the content item being selected among search results having a common attribute over a threshold percentage of time, such as 50%. Correlations such as these may also require administrator approval through a user interface, in accordance with at least one embodiment.

The machine learning module 608 may include one or more temporal analysis models 245, for example as described above with reference to the temporal analysis model 86 of FIG. 2. The machine learning module 608 may be configured to analyze the media content items 104 and generate content associations for the media content items 104 based on temporal analysis data extracted from the media content items 104.

A search router rules engine 206 may further include rules for processing search queries to optimize processing time and to include search results even where no direct match exists in the media content management system 100. For example, the search router rules engine 206 may operate in conjunction with a sentiment analysis module 220, an image analyzer 222, and/or a movement analyzer 224 to analyze content items in the media content store 106 that do not have associated attributes. A sentiment analysis module 220 may be used to process words, partial words, and search queries to determine whether the intent includes positive, negative, or neutral connotations. An image analyzer 222 may be similarly used to process received images received as search queries to extract an intent of the searching user. For example, if the image is a photo captured by a mobile device directly sent as a query, the photo may be analyzed by the image analyzer 222 to detect visual characteristics, such as facial expressions and activities occurring in the photo. Further, a movement analyzer 224 may be used to detect actions, behaviors, and patterns of movement, such as laughing, crying, falling, shaking hands, first bumping, chest thumping, eye rolling, hair flipping, and so forth. Rules may be included in the search router rules engine 206 to associate identified behaviors, actions, activities, and/or facial expressions to one or more expressive statements that are stored as content associations in the content association store 118. These rules may be heuristic rules generated by a heuristics engine 216, in one embodiment.

Figure 9:
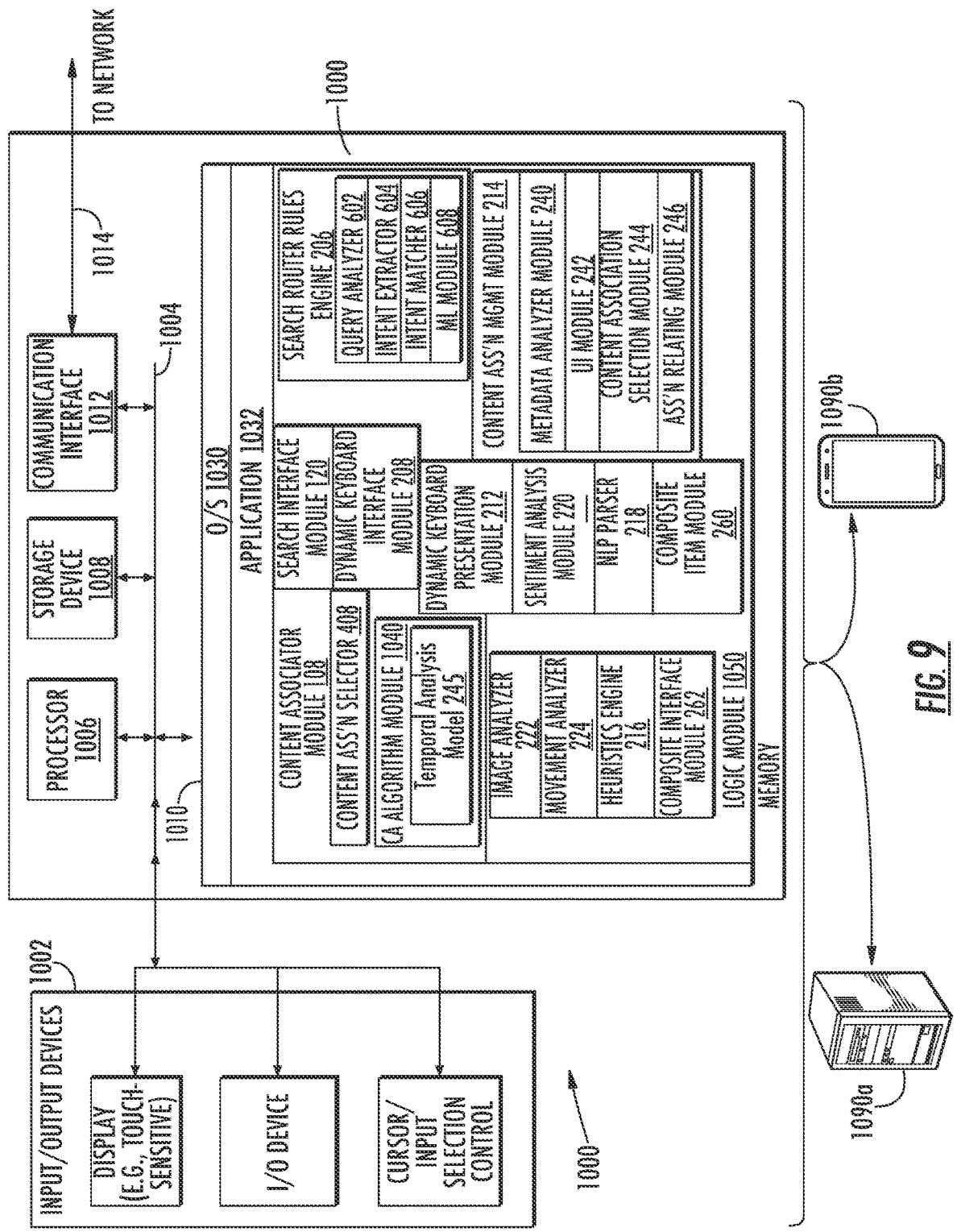
FIG. 9 illustrates an exemplary computing platform disposed in a device configured to procure, organize, and/or retrieve expressive media content according to aspects of the present disclosure.

FIG. 9 illustrates an exemplary computing platform disposed in a device configured to categorize procured content for performing search in a media content management system 100 in accordance with various embodiments. In some examples, computing platform 1000 may be used to implement computer programs, applications, methods, processes, algorithms, or other software to perform the above-described techniques.

In some cases, computing platform can be disposed in wearable device or implement, a mobile computing device 1090 *b*, or any other device, such as a computing device 1090 *a*.

Computing platform 1000 includes a bus 1004 or other communication mechanism for communicating information, which interconnects subsystems and devices, such as processor 1006, system memory 1010 (e.g., RAM, etc.), storage device 1008 (e.g., ROM, etc.), a communication interface 1012 (e.g., an Ethernet or wireless controller, a Bluetooth controller, etc.) to facilitate communications via a port on communication link 1014 to communicate, for example, with a computing device, including mobile computing and/or communication devices with processors. Processor 1006 can be implemented with one or more central processing units ("CPUs"), or one or more virtual processors, as well as any combination of CPUs and virtual processors. Computing platform 1000 exchanges data representing inputs and outputs via input-and-output devices 1002, including, but not limited to, keyboards, mice, audio inputs (e.g., speech-to-text devices), user interfaces, displays, monitors, cursors, touch-sensitive displays, LCD or LED displays, and other I/O-related devices.

According to some examples, computing platform 1000 performs specific operations by processor 1006 executing one or more sequences of one or more instructions stored in system memory 1010, and computing platform 1000 can be implemented in a client-server arrangement, peer-to-peer arrangement, or as any mobile computing device, including smart phones and the like. Such instructions or data may be read into system memory 1010 from another computer readable medium, such as storage device 1008. In some examples, hard-wired circuitry may be used in place of or in combination with software instructions for implementation. Instructions may be embedded in software or firmware. The term "computer readable medium" refers to any tangible medium that participates in providing instructions to processor 1006 for execution. Such a medium may take many forms, including but not limited to, non-volatile media and volatile media. Non-volatile media includes, for example, optical or magnetic disks and the like. Volatile media includes dynamic memory, such as system memory 1010.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1004 for transmitting a computer data signal.

In some examples, execution of the sequences of instructions may be performed by computing platform 1000. According to some examples, computing platform 1000 can be coupled by communication link 1014 (e.g., a wired network, such as LAN, PSTN, or any wireless network, including WiFi of various standards and protocols, Blue Tooth®, Zig-Bee, etc.) to any other processor to perform the sequence of instructions in coordination with (or asynchronous to) one another. Computing platform 1000 may transmit and receive messages, data, and instructions, including program code (e.g., application code) through communication link 1014 and communication interface 1012. Received program code may be executed by processor 1006 as it is received, and/or stored in memory 1010 or other non-volatile storage for later execution.

In the example shown, system memory 1010 can include various modules that include executable instructions to implement functionalities described herein. System memory 1010 may include an operating system ("O/S") 1030, as well as an application 1032 and/or logic module 1050. In the example shown, system memory 1010 includes a content associator module 108 including a content association ("ass'n"), selector module 408, and a content associating ("CA") algorithm module 1040. The content associator module 108 may include one or more temporal analysis models 245, for example as described above with reference to the temporal analysis model 86 of FIG. 2. The content associator module 108 may be configured to analyze the media content items 104 and generate content associations for the media content items 104 based on temporal analysis data extracted from the media content items 104.

The system memory 1010 may also include an image analyzer 222, a movement analyzer 224, a heuristics engine 216, a search interface module 120, a dynamic keyboard interface module 208, a dynamic keyboard presentation module 212, a sentiment analysis module 220, a natural language processing (NLP) parser 218, a search router rules engine 206 including a query analyzer 602, an intent extractor 604, an intent matcher 606, and a machine learning (ML) module 608, a content association ("ass'n") management ("mgmt.") module 214 including a metadata analyzer module 240, a user interface module 242, a content association selection module 244, and an association ("ass'n") relating module 246. The system memory 1010 may further include a composite item module 260 and a composer interface module 262. One or more of the modules included in memory 1010 can be configured to provide or consume outputs to implement one or more functions described herein.

In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, a media content management system or one or more of its components, or any process or device described herein, can be in communication (e.g., wired or wirelessly) with a mobile device, such as a mobile phone or computing device, or can be disposed therein.

In some cases, a mobile device, or any networked computing device (not shown) in communication with an action alert controller or one or more of its components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figure can represent one or more algorithms. Or, at least one of the elements can represent a portion of logic including a portion of hardware configured to provide constituent structures and/or functionalities.

For example, a dynamic keyboard presentation module 212 or any of its one or more components, or any process or device described herein, can be implemented in one or more computing devices (i.e., any mobile computing device, such as a wearable device, an audio device (such as headphones or a headset) or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, a media content management system, including one or more components, or any process or device described herein, can be implemented in one or more computing devices that include one or more circuits. Thus, at least one of the elements in the above-described figures can represent one or more components of hardware. Or, at least one of the elements can represent a portion of logic including a portion of circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method comprising:
   receiving, by a computing system comprising one or more computing devices, data describing a media content item comprising a plurality of image frames for sequential display, wherein the plurality of image frames comprises a first image frame comprising a first text string and a second image frame for display sequentially after the first image frame, the second image frame comprising a second text string;
   inputting, by the computing system, the data describing the media content item into a machine-learned temporal analysis model that is configured to receive the data describing the media content item, and in response to receiving the data describing the media content item, output temporal analysis data that describes temporal information associated with sequentially viewing the plurality of image frames of the media content item; and
   receiving, by the computing system and as an output of the machine-learned temporal analysis model, the temporal analysis data, wherein the temporal information described by the temporal analysis data describes a semantic meaning described by the first text string being sequentially read before the second text string that is not described by individually reading the first text string or the second text string.

2. The computer-implemented method of claim 1, wherein the temporal information is not described by individual image frames of the plurality of image frames.

3. The computer-implemented method of claim 1, wherein one or more of the first text string and second text string comprises a single word without additional words or a single letter without additional letters.

4. The computer-implemented method of claim 1, wherein the first text string of the first image frame has an appearance that differs from an appearance of the second text string of the second image frame by at least one of color, boldness, location, or font.

5. The computer-implemented method of claim 4, wherein the temporal analysis data describes a semantic meaning associated with the first text string having the appearance that differs from the appearance of the second text string.

6. The computer-implemented method of claim 1, wherein:
   the plurality of image frames comprises a first image frame describing a first scene and a second image frame for display sequentially after the first image frame, the second image frame describing a second scene; and
   the temporal information described by the temporal analysis data describes a semantic meaning described by the first scene being sequentially viewed before the second scene that is not described by individually viewing the first scene or the second scene.

7. The computer-implemented method of claim 1, wherein the temporal analysis data describes an emotional content of the media content item.

8. The computer-implemented method of claim 1, further comprising assigning a content label to the media content item based on the temporal information described by the temporal analysis data.

9. The computer-implemented method of claim 1, wherein the media content item comprises an advertisement.

10. The computer-implemented method of claim 9, wherein the temporal information described by the temporal analysis data describes an emotional content of the advertisement.

11. The computer-implemented method of claim 1, further comprising:
    receiving, by a user computing device of the computing system, a search query for a media content item;
    selecting, by the computing system, the media content item based on the temporal analysis data that describes temporal information; and
    providing, by the computing system in response to the search query, the media content item.

12. The computer-implemented method of claim 11, further comprising providing for display, by a user computing device of the computing system, a dynamic keyboard interface, and wherein the search query is received within a dynamic keyboard interface provided by the user computing device.

13. A computing system comprising:
    one or more processors;
    a machine-learned temporal analysis model that is configured to receive data describing the media content item, and in response to receiving the data describing the media content item, output temporal analysis data that describes temporal information associated with sequentially viewing the plurality of image frames of the media content item, and wherein the temporal information is not described by individual image frames of the plurality of image frames;
    one or more non-transitory computer-readable media that collectively store instructions that, when executed by the one or more processors, cause the computing system to perform operations, the operations comprising:
       receiving data describing a media content item comprising a plurality of image frames for sequential display, wherein the plurality of image frames comprises a first image frame comprising a first text string and a second image frame for display sequentially after the first image frame, the second image frame comprising a second text string;

inputting the data describing the media content item into the machine-learned temporal analysis model; and receiving, as an output of the machine-learned temporal analysis model, the temporal analysis data, wherein the temporal information described by the temporal analysis data describes a semantic meaning described by the first text string being sequentially read before the second text string that is not described by individually reading the first text string or the second text string.

14. The computing system of claim 13, wherein one or more of the first text string and second text string comprises a single word without additional words or a single letter without additional letters.

15. The computing system of claim 13, wherein the first text string of the first image frame has an appearance that differs from an appearance of the second text string of the second image frame by at least one of color, boldness, location, or font.

16. The computing system of claim 15, wherein the temporal analysis data describes a semantic meaning associated with the first text string having the appearance that differs from the appearance of the second text string.

17. The computing system of claim 13, wherein the media content item comprises an advertisement, and wherein the temporal information described by the temporal analysis data describes an emotional content of the advertisement.

18. A computer-implemented method for training a machine-learned temporal analysis model, the method comprising:

receiving, by a computing system comprising one or more computing devices, data describing a media content item comprising a plurality of image frames for sequential display, wherein the plurality of image frames comprises a first image frame comprising a first text string and a second image frame for display sequentially after the first image frame, the second image frame comprising a second text string;

inputting, by the computing system, the data describing the media content item into the machine-learned temporal analysis model that is configured to receive the data describing the media content item, and in response to receiving the data describing the media content item, output temporal analysis data that describes temporal information associated with sequentially viewing the plurality of image frames of the media content item, and wherein the temporal information is not described by individual image frames of the plurality of image frames;

receiving, by the computing system and as an output of the machine-learned temporal analysis model, the temporal analysis data, wherein the temporal analysis data describes a semantic meaning described by the first text string being sequentially read before the second text string that is not described by individually reading the first text string or the second text string; and adjusting, by the computing system, one or more parameters of the machine-learned temporal analysis model based on a comparison of the temporal analysis data with ground truth temporal analysis data.

* * * * *